(12) United States Patent
Khan et al.

(10) Patent No.: US 11,228,616 B2
(45) Date of Patent: Jan. 18, 2022

(54) METHODS AND SYSTEMS FOR MONITORING NETWORK SECURITY

(71) Applicant: Qatar Foundation, Doha (QA)

(72) Inventors: Khaled M. Khan, Jamisontown (AU);
Dong Seong Kim, Christchurch (NZ);
Jin Bum Hong, Christchurch (NZ);
Simon Enoch Yusuf, Christchurch (NZ); Mengmeng Ge, Christchurch (NZ); Huy Kang Kim, Seoul (KR);
Paul Kim, Christchurch (NZ);
Armstrong Nhlabatsi, Hlathikhulu (SZ); Noora Fetais, Doha (QA)

(73) Assignee: Qatar Foundation, Doha (QA)

( * ) Notice: Subject to any disclaimer, the term of this patent is extended or adjusted under 35 U.S.C. 154(b) by 125 days.

(21) Appl. No.: 16/211,762

(22) Filed: Dec. 6, 2018

(65) Prior Publication Data
US 2019/0190955 A1 Jun. 20, 2019

Related U.S. Application Data

(60) Provisional application No. 62/595,307, filed on Dec. 6, 2017.

(51) Int. Cl.
*H04L 29/06* (2006.01)
*G06F 21/55* (2013.01)

(52) U.S. Cl.
CPC .......... *H04L 63/20* (2013.01); *G06F 21/554* (2013.01); *H04L 63/1408* (2013.01); *H04L 63/1433* (2013.01)

(58) Field of Classification Search
CPC . H04L 63/1408; H04L 63/1433; G06F 21/50; G06F 21/55; G06F 21/552; G06F 21/554
See application file for complete search history.

(56) References Cited

U.S. PATENT DOCUMENTS 7,627,900 B1 12/2009 Noel
7,890,869 B1 * 2/2011 Mayer .................... H04L 41/22
715/736

(Continued)

OTHER PUBLICATIONS

S. Jha, O. Sheyner, and J. Wing, "Two Formal Analyses of Attack Graphs," in Proceedings of the 15th IEEE Computer Security Foundations Workshop. IEEE Computer Security Foundations, Jun. 2002.

(Continued)

*Primary Examiner* — Eric W Shepperd
(74) *Attorney, Agent, or Firm* — Martin & Ferraro, LLP

(57) ABSTRACT

A computer-implemented method for monitoring the security of a computing network which includes a plurality of hosts and a plurality of edges which link connected hosts. The method comprises capturing and storing first and second network state information at first and second times respectively. The method comprises comparing the first and second network state information to detect a change in the security of the network during the time window between the first and second times. The method further comprises storing security change data which is indicative of the change in the security of the network during the time window for a user to monitor the change in the security of the network.

12 Claims, 20 Drawing Sheets

(56) References Cited

U.S. PATENT DOCUMENTS

| | | | | |
|---|---|---|---|---|
| 8,881,288 | B1* | 11/2014 | Levy | H04L 63/1408 726/25 |
| 2007/0150938 | A1* | 6/2007 | Moon | H04L 41/5064 726/2 |
| 2008/0046393 | A1 | 2/2008 | Jajodia | |
| 2010/0275263 | A1* | 10/2010 | Bennett | G06F 21/577 726/25 |
| 2011/0289119 | A1* | 11/2011 | Hu | G06F 11/3006 707/803 |
| 2012/0224510 | A1* | 9/2012 | Bulusu | H04L 45/02 370/256 |
| 2014/0004875 | A1* | 1/2014 | Agarwal | H04M 15/58 455/456.1 |
| 2014/0280143 | A1* | 9/2014 | Milenova | G06F 16/285 707/737 |
| 2015/0304346 | A1* | 10/2015 | Kim | H04L 43/04 726/23 |
| 2016/0028758 | A1* | 1/2016 | Ellis | H04L 63/1433 726/25 |
| 2016/0364927 | A1* | 12/2016 | Barry | G07C 9/00571 |
| 2017/0155557 | A1* | 6/2017 | Desai | H04L 43/08 |
| 2017/0264637 | A1* | 9/2017 | Meng | G06F 9/45558 |
| 2019/0123960 | A1* | 4/2019 | Maiya Belur | H04L 41/0826 |

OTHER PUBLICATIONS

N. Idika and B. Bhargava, "Extending Attack Graph-based Security Metrics and Aggregating their Application," IEEE Transactions on Dependable and Secure Computing (TDSC), vol. 9, No. 1, pp. 75-85, Feb. 2012.

K. Ingols, M. Chu, R. Lippmann, S. Webster, and S. Boyer, "Modeling Modern Network Attacks and Countermeasures Using Attack Graphs," in Annual Computer Security Applications Conference (ACSAC), Dec. 2009, pp. 117-126.

G. S. Bopche and B. M. Mehtre, "Graph Similarity Metrics for As-sessing Temporal Changes in Attack Surface of Dynamic Networks," Compututer & Security, vol. 64, No. C, pp. 16-43, Jan. 2017.

N. Poolsappasit, R. Dewri, and I. Ray, "Dynamic Security Risk Management Using Bayesian Attack Graphs," IEEE Transactions on Dependable and Secure Computing, vol. 9, No. 1, pp. 61-74, Jan. 2012.

S. Y. Enoch, M. Ge, J. B. Hong, H. Alzaid, and D. S. Kim, "Evaluating the Effectiveness of Security Metrics for Dynamic Networks," in Proceedings of the 16th IEEE International Conference on Trust, Security and Privacy in Computing and Communications (TrustCom 2017). IEEE, Aug. 2017, pp. 277-284.

C. Phillips and L. P. Swiler, "A Graph-based System for Network Vulnerability Analysis," in Proceedings of the 1998 workshop on New Security paradigms. ACM, Jan. 1998, pp. 71-79.

S. Abraham and S. Nair, "A Predictive Framework for Cyber Security Analytics using Attack Graphs," International Journal of Computer Networks and Communications (IJCNC 2015), vol. 7, No. 1, Jan. 2015.

X. Ou, W. F. Boyer, and M. A. McQueen, "A Scalable Approach to Attack Graph Generation," in Proceedings of the 13th ACM Conference on Computer and Communications Security (CCS 2006). ACM, Aug. 2006, pp. 336-345.

S. Y. Enoch, M. Ge, J. B. Hong, H. K. Kim, P. Kim, and D. S. Kim, "Security Modelling and Analysis of Dynamic Enterprise Networks," in Proceedings of the 16th IEEE International conference on Computer and Information Technology, (CIT 2016). IEEE, Dec. 2016, pp. 249-256.

S. Y. Enoch, J. B. Hong, M. Ge, H. Alzaid, and D. S. Kim, "Automated security investment analysis of dynamic networks," in Proceedings of the Australasian Computer Science Week Multiconference, ser. ACSW '18. New York, NY, USA: ACM, Jan. 29-Feb. 2, 2018, pp. 6:1-6:10. [Online]. Available: http://doi.acm.org/10.1145/3167918.3167964.

J. B. Hong and D. S. Kim, "Scalable Security Model Generation and Analysis Using k-importance Measures," in International Conference on Security and Privacy in Communication Systems. Springer, Sep. 2013, pp. 270-287.

S. Y. Enoch, J. B. Hong, M. Ge, and D. S. Kim, "Composite Metrics for Network Security Analysis," Software Networking, vol. 2017, No. 1, pp. 137-160, Feb. 2017. [Online]. Available: http://dx.doi.org/10.13052/jsn2445-9739.2017.007.

R. Zhuang, S. Zhang, A. Bardas, S. A. DeLoach, X. Ou, and A. Singhal, "Investigating the Application of Moving Target Defenses to Network Security," in 6th International Symposium on Resilient Control Systems (ISRCS), Aug. 2013, pp. 162-169.

B. Lantz, B. Heller, and N. McKeown, "A Network in a Laptop: Rapid Prototyping for Software-defined Networks," in Proc. of the 9th ACM SIGCOMM Workshop. ACM, Oct. 2010, pp. 19:1-19:6.

P. Mell and T. Grance, "SP 800-145. The NIST Definition of Cloud Computing," NIST, Gaithersburg, MD, United States, Tech. Rep., Sep. 2011.

D. Kreutz, F. Ramos, P. Verissimo, C. Rothenberg, S. Azodolmolky, and S. Uhlig, "Software-Defined Networking: A Comprehensive Survey," Proc. of the IEEE, vol. 103, No. 1, pp. 14-76, Jan. 2015.

O. Sheyner, J. Haines, S. Jha, R. Lippmann, and J. Wing, "Automated Generation and Analysis of Attack Graphs," CMU, Tech. Rep., Feb. 2002.

B. Nunes, M. Mendonca, X. Nguyen, K. Obraczka, and T. Turletti, "A Survey of Software-Defined Networking: Past, Present, and Future of Programmable Networks," IEEE Communications Surveys Tutorials, vol. 16, No. 3, pp. 1617-1634, Feb. 2014.

B. Danev, R. Masti, G. Karame, and S. Capkun, "Enabling Secure VMvTPM Migration in Private Clouds," in Proc. of the ACSAC 2011. ACM, Dec. 2011, pp. 187-196.

S. Yusuf, M. Ge, J. Hong, H. Kim, P. Kim, and D. Kim, "Security Modelling and Analysis of Dynamic Enterprise Networks," in Proc. of the IEEE CIT 2016, Dec. 2016, pp. 249-256.

M. Ford, K. Keefe, E. LeMay, W. Sanders, and C. Muehrcke, "Implementing the ADVISE Security Modeling Formalism in Mobius," in Proc. of the IEEE/IFIP DSN Sep. 2013, 2013, pp. 1-8.

B. Louise and T. Henry, "Bring your own Device," ITNOW, vol. 54, No. 1, pp. 24-25, 2012.

J. B. Hong, D. S. Kim, and A. Haqiq, "What Vulnerability Do We Need to Patch First?" in Proceeding of the 44th Annual IEEE/IFIP International Conference on Dependable Systems and Networks, Jun. 2014, pp. 684-689.

J. B. Hong and D. S. Kim, "Assessing the Effectiveness of Moving Target Defenses Using Security Models," *IEEE Transactions on Dependable and Secure Computing*, vol. 13, No. 2, pp. 163-177, Mar. 2016.

L. Wang, M. Albanese, and S. Ja jodia, *Network HardeningAn Automated Approach to Improving Network Security*. Berlin, Heidelberg: Springer Briefs in Computer Science, 2014.

V. Saini, Q. Duan, and V. Paruchuri, "Threat Modeling Using Attack Trees," *J. Comput. Sci. Coll.*, vol. 23, No. 4, pp. 124-131, Apr. 2008.

S. Mauw and M. Oostdijk, "Foundations of Attack Trees," in *Proceeding of International Conference on Information Security and Cryptology (ICISC) LNCS 3935*. Springer, 2005, pp. 186-198.

S. Abraham and S. Nair, "Predicitve Cyber Security Analytics Framework: A Nonhomogenous Model for Security Quantification," in *Proceedings of International Conference of Security, Privacy and Trust Management*, 2014.

A. Roy, D. S. Kim, and K. S. Trivedi, "ACT: Towards Unifying the Constructs of Attack and Defense Trees," *Sec. and Commun. Netw.*, vol. 5, No. 8, pp. 929-943, 2012.

M. Frigault, L. Wang, A. Singhal, and S. Ja jodia, "Measuring Network Security Using Dynamic Bayesian Network," in *Proceedings of the 4th ACM workshop on Quality of Protection*. ACM, 2008, pp. 23-30.

H. M. J. Almohri, L. T. Watson, D. Yao, and X. Ou, "Security Optimization of Dynamic Networks with Probabilistic Graph Modeling and Linear Programming," *IEEE Transactions on Dependable and Secure Computing*, vol. 13, No. 4, pp. 474-487, Jul. 2016.

I. Nwokedi, *Characterizing and Aggregating Attack Graph-based Security Metric, Ph.D. Thesis*. Center for Education and Research, Information Assurance and Security, Purdue University, 2010.

(56) References Cited

OTHER PUBLICATIONS

R. Lippmann, K. Ingols, C. Scott, K. Piwowarski, K. Kratkiewics, M. Artz, and R.Cunningham, "Validating and Restoring Defense in Depth using Attack Graphs," in *Proceedings of Military Communications Conference*, 2006, pp. 31-38.

R. Ortalo, Y. Deswarte, and M. Kaaniche, "Experimenting with Quantitative Evaluation tools for Monitoring Operational Security," *IEEE Transactions on Software Engineering*, vol. 25, No. 5, pp. 633-650, 1999.

W. Li and R. Vaughn, "Security Research Involving the Modeling of Network Exploitations Graphs," in *Proceedings of 6th IEEE International Symposium Cluster Computing and Grid Workshops*, 2006.

J. Scott, *Social Network Analysis*. SAGE Publications, 2012. [Online]. Available: https://books.google.co.nz/books?id=MJoIGBIYDGEC.

K. Lerman, R. Ghosh, and J. H. Kang, "Centrality Metric for Dynamic Networks," in *Proceedings of the Eight Workshop on Mining and Learning with Graphs*. ACM, 2010, pp. 70-77.

D. Braha and Y. Bar-Yam, "From Centrality to Temporal Fame: Dynamic Centrality in Complex Networks," in *Social Science Research Network Working Paper Series*, 2006.

Vassilis Kostakos, "Temporal Graphs," *Statistical Mechanics and its Applications*, vol. 388, No. 6, pp. 81 007-1023, 2009.

D. Kempe, J. Kleinberg, and A. Kumar, "Connectivity and Inference Problems for Temporal Networks," *Journal of Computer and System Sciences*, vol. 64, No. 4, pp. 820-842, 2002. [Online]. Available: http://www.sciencedirect.com/science/article/pii/S0022000002918295.

A. Casteigts, P. Flocchini, W. Quattrociocchi, and N. Santoro, "Time-Varying Graphs and Dynamic Networks," in *Proceedings of 10th International Conference on Ad-hoc, Mobile, and Wireless Networks*. Berlin, Heidelberg: Springer Berlin Heidelberg, 2011, pp. 346-359.

K. Wehmuth, A. Ziviani, and E. Fleury, "A Unifying Model for Representing Time-Varying Graphs," *CoRR*, vol. abs/1402.3488, 2014. [Online]. Available: http://arxiv.org/abs/1402.3488.

J. Tang, I. Leontiadis, S. Scellato, V. Nicosia, C. Mascolo, M. Musolesi, and V. Latora, "Applications of Temporal Graph Metrics to Real-World Networks," *CoRR*, vol. abs/1305.6974, 2013. [Online]. Available: http://arxiv.org/abs/1305.6974.

B.-M. Bui-Xuan, A. Ferreira, and A. Jarry, "Evolving Graphs and least Cost Journeys in Dynamic Networks," in *WiOpt'03: Modeling and Optimization in Mobile, Ad Hoc and Wireless Networks*, Sophia Antipolis, France, Mar. 2003. [Online]. Available: https://hal.inria.fr/inria-00466676.

A. Ferreira, "Building a Reference Combinatorial Model for MANETs," *IEEE Network*, vol. 18, No. 5, pp. 24-29, Sep. 2004.

N. Santoro, W. Quattrociocchi, P. Flocchini, A. Casteigts, and F. Amblard, "Time varying Graphs and Social Network Analysis: Temporal indicators and Metrics," in *Artificial Intelligence and Simulation of Behaviour AISB*, 2011.

K. Hausken and V. M. Bier, *"Defending Against Multiple Different Attackers,"* European Journal of Operational Research Elsevier, vol. 211, No. 2, pp. 370-384, 2011.

F. Arnold, D. Guck, R. Kumar, and M. Stoelinga, "Sequential and Parallel Attack Tree Modelling," in *Proceedings of the International Conference on Computer Safety, Reliability and Security*. Cham: Springer International Publishing, 2015, pp. 291-299.

J. B. Hong, D. S. Kim, and T. Takaoka, "Scalable Attack Representation Model using Logic Reduction Techniques," in *Proceedings of the 12th IEEE International Conference on Trust, Security and Privacy in Computing and Communications (TrustCom, 2013)*. IEEE, Jul. 2013, pp. 404-411.

B. Schneier, "Attack Trees," *Dr. Dobbs Journal of Software Tools*, vol. 24, No. 12, pp. 21-29, 1999.

S. Liu and B. Cheng, "Cyberattacks: Why, What, Who, and How," *IT Professional*, vol. 11, No. 3, pp. 14-21, May 2009.

G. S. Bopche and B. M. Mehtre, "Graph Similarity Metrics for Assessing Temporal Changes in Attack Surface of Dynamic Networks," *Comput. Secur.*, vol. 64, No. C, pp. 16-43, Jan. 2017.

J. B. Hong and D. S. Kim, "Scalable Security Model Generation and Analysis using Kimportance Measures," in *Proceeding of Security and Privacy in Communication Networks*, 2013, pp. 270-287.

B. Brykczynski and R. A. Small, "Reducing Internet-based Intrusions: Effective Security Patch Management," *IEEE Software*, vol. 20, No. 1, pp. 50-57, Jan. 2003.

A. Singhal and X. Ou, *Security Risk Analysis of Enterprise Networks Using Probabilistic Attack Graphs Technical Report NISTIR 7788, National Institute of Standards and Technology*, (Sep. 2011).

R. Deraison, *Nessus Scanner*; Tenable—Nessus Vulnerability Assessment; https://www.tenable.com/products/nessus.

Nmap, *Nmap-Network Mapper*; https://nmap.org/index.html.

NVD, *National Vulnerability Database*, Apr. 19, 2016; https://nvd.nist.gov/vuln/detail/cve-2015-5479#vulnCurrentDescriptionTitle.

MITRE-Corporation, *Common Vulnerabilities and Exposures*, CVE Numbering Authorities; https://cve.mitre.org/cve/cna.html.

MITRE-Corporation, *Common Vulnerabilities and Exposures*, Jul. 10, 2015, CVE-ID: CVE-2015-5479; https://cve.mitre.org/cgi-bin/cvename.cgi?name-cve-2015-5479.

MITRE-Corporation, *Common Vulnerabilities and Exposures*, May 3, 2017, CVE-ID: CVE-2017-8464; https://cve.mitre.org/cgi-bin/cvename.cgi?name-cve-2017-8464.

MITRE-Corporation, *Common Vulnerabilities and Exposures*, May 3, 2017, CVE-ID: CVE-2017-8589; https://cve.mitre.org/cgi-bin/cvename.cgi?name-cve-2017-8589.

MITRE-Corporation, *Common Vulnerabilities and Exposures*, Jun. 26, 2017, CVE-ID: CVE-2017-9953; https://cve.mitre.org/cgi-bin/cvename.cgi?name-cve-2017-9953.

OpenVAS, *Open Vulnerability Assessment Scanner*; https://www.openvas.org.

CVSS,*Common Vulnerability Scoring System v3.0*, Specification Document; https://www.first.org/cvss.

NIST, Common Vulnerabilities and Exposures, CVE List Home; https://cve.mitre.org/cve/.

CERT, *Recent Vulnerabilities Computer Emergency Response Team*; Vulnerability Note VU#583776, Mar. 1, 2016; https://www.kb.cert.org/vuls/id/583776.

NVD, National Vulnerability Database, Feb. 3, 2018; https://nvd.nist.gov/vuln/detail/cve-2017-8464#vulnCurrentDescriptionTitle.

\* cited by examiner

Table 2: The enterprise network routing rules.

| Host | Only accept traffic from |
|---|---|
| $WS_1$ | Internet |
| $WS_2$ | $WS_1$ |
| $WS_3$ | $WS_2$ |
| $WS_4$ | $WS_2, WS_3$ |
| $AS_1$ | $WS_3, WS_4$ |
| $AS_2$ | $AS_1, WS_4$ |
| $DB_1$ | $DB_2, AS_1$ |
| $DB_2$ | $AS_2$ |
| $DB_3$ | $DB_1, DB_2$ |

Figure 3

Table 3: Notations used in the security metrics computation.

| Notation | Metric |
|---|---|
| Vulnerability level | |
| $ac_i^v$ | is the attack cost of a vulnerability |
| $r_i^v$ | is the attack risk of a vulnerability |
| $pr_i^v$ | is the probability of attack success of a vulnerability |
| $aim_i^v$ | is the attack impact of a vulnerability |
| $roa_i^v$ | is the return on attack of a vulnerability |
| Host level | |
| $ac_i^h$ | is the attack cost of a host |
| $r_i^h$ | is the attack risk of a host |
| $pr_i^h$ | is the probability of attack success of a host |
| $aim_i^h$ | is the attack impact of a host |
| $roa_i^h$ | is the return on attack of a host |
| Attack path level | |
| $ap$ | is an attack path which includes a sequence of hosts |
| $ac_i^{ap}$ | is the attack cost on a path |
| $r_i^{ap}$ | is the attack risk on a path |
| $pr_i^{ap}$ | is the probability of attack success on a path |
| $aim_i^{ap}$ | is the attack impact on path |
| $roa_i^{ap}$ | is the return on attack on a path |
| Network level | |
| $AP_{t_i}$ | is all the possible paths from an attacker to a target for each snapshots at $t_i$. Each $ap \in AP_{t_i}$ |
| $AC_{t_i}$ | is the minimum cost of the paths in $AP_{t_i}$ |
| $R_{t_i}$ | is the maximum risk of the paths in $AP_{t_i}$ |
| $ROA_{t_i}$ | is the maximum return on attack of the paths in $AP_{t_i}$ |
| $Pr_{t_i}$ | is the maximum probability of attack success of the paths in $AP_{t_i}$ |
| $f$ | is a function that identifies the length of the $ap$ that occurs most frequently |

Figure 4

Table 4: Security Metrics used in the evaluation

| Metrics | Formulae |
|---|---|
| R | $r_{c_i}^{ap} = \sum_{h \in ap} r_{c_i}^h, ap \in AP_{c_i}$ <br> $R_{c_i} = \max_{ap \in AP_{c_i}} r_{c_i}^{ap}$ |
| ROA | $roa_{c_i}^{ap} = \sum_{h \in ap} \frac{r_{c_i}^h \cdot ac_{c_i}^h}{ac_{c_i}^h}, ap \in AP_{c_i}$ <br> $ROA_{c_i} = \max_{ap \in AP_{c_i}} roa_{c_i}^{ap}$ |
| Pr | $pr_{c_i}^{ap} = \prod_{h \in ap} pr_{c_i}^h, ap \in AP_{c_i}$ <br> $pr_{c_i} = \max_{ap \in AP_{c_i}} pr_{c_i}^{ap}$ |
| AC | $ac_{c_i}^{ap} = \sum_{h \in ap} ac_{c_i}^h, ap \in AP_{c_i}$ <br> $AC_{c_i} = \min_{ap \in AP_{c_i}} ac_{c_i}^{ap}$ |
| SAP | $SAP_{c_i} = \min_{ap \in AP_{c_i}} |ap|$ |
| NAP | $NAP_{c_i} = |AP_{c_i}|$ |
| MAPL | $MAPL_{c_i} = \frac{\sum_{ap \in AP_{c_i}} |ap|}{NAP}$ |
| NMPL | $NMPL_{c_i} = \frac{SAP}{NAP}$ |
| SDPL | $SDPL_{c_i} = \sqrt{\frac{\sum_{ap \in AP_{c_i}}(|ap| - MAPL)^2}{NAP}}$ |
| MoPL | $MoPL_{c_i} = f_{ap \in AP_{c_i}}(|ap|)$ |

Figure 5

Table 5: Categorisation of network changes

| Enterprise network changes | | Possible change(s) in GSM |
|---|---|---|
| Categories | Subcategories | |
| Host | Update software | RV, RE, RN |
| | Uninstall software | RV, RN, RE |
| | Install software | AV, AN, AE |
| | Software turn on \ enable | AV, AN, AE |
| | Software turn off \ disable | RV, RN, RE |
| Edges (reachability) | Firewall rules change (e.g., addition new rule) | AE, RE |
| | Forwarding table change (by SDN) | AE, RE |
| | Connection of new host | AN, AE, AV |
| | Disconnection of existing host | RN, RE, RV |
| | Host turn on | AN, AE, AV |
| | Host turn off \ failure | RN, RE, RV |

Figure 6

Table 6: Network Centrality Measures of the enterprise network

| Host ID | Degree | Closeness | Betweenness | Average ($NS_x$) |
|---|---|---|---|---|
| $WS_1$ | 0.2222 | 0.2863 | 0.1111 | 0.3369 |
| $WS_2$ | 0.3333 | 0.3403 | 0.1944 | 0.3804 |
| $WS_3$ | 0.3333 | 0.3333 | 0.0556 | 0.2407 |
| $WS_4$ | 0.4444 | 0.3086 | 0.1667 | 0.3366 |
| $AS_1$ | 0.4444 | 0.2863 | 0.1319 | 0.3369 |
| $AS_2$ | 0.3333 | 0.2600 | 0.1042 | 0.2125 |
| $DB_1$ | 0.3333 | 0.1111 | 0.0625 | 0.1690 |
| $DB_2$ | 0.3333 | 0.2222 | 0.0486 | 0.3014 |
| $DB_3$ | 0.2222 | 0.0800 | 0.0000 | 0.0741 |

Figure 7

Table 7: Scenario-I: List of Vulnerabilities

| ID | Host | CVE-ID | CVSS BS | $as_x$ | $ams_x$ | $pr_x^2$ | $CV_x$ |
|---|---|---|---|---|---|---|---|
| $V_1$ | $WS_1$ | CVE-2015-3185 | 4.3 | 5.7 | 5.3 | 0.63 | 0.3199 |
| $V_2$ | $WS_2$ | CVE-2015-3185 | 4.3 | 5.7 | 5.3 | 0.63 | 0.3397 |
| $V_3$ | $WS_3$ | CVE-2015-3185 | 4.3 | 5.7 | 5.3 | 0.63 | 0.3354 |
| $V_4$ | $WS_4$ | CVE-2015-3185 | 4.3 | 5.7 | 5.3 | 0.63 | 0.2683 |
| $V_5$ | $AS_1$ | CVE-2016-0777 | 7.5 | 2.5 | 2.8 | 0.75 | 0.5204 |
| $V_6$ | $AS_2$ | CVE-2016-0763 | 6.5 | 3.5 | 3.8 | 0.65 | 0.4313 |
| $V_7$ | $DB_1$ | CVE-2016-0499 | 9.0 | 1.0 | 1.3 | 0.90 | 0.5345 |
| $V_8$ | $DB_2$ | CVE-2016-0611 | 4.0 | 6.0 | 6.4 | 0.40 | 0.3097 |
| $V_9$ | $DB_3$ | CVE-2016-0546 | 7.3 | 2.8 | 3.2 | 0.72 | 0.3979 |

Figure 8

Note: on the x – axis, where:
0 – initial security level with no patch
2 – security level after patching $AS_1$
4 – security level after patching $WS_4$
6 – security level after patching $DB_2$
1 – security level after patching $DB_1$
3 – security level after patching $AS_2$
5 – security level after patching $WS_3$ Table 8: Scenario II: Summary of Vulnerabilities

| month | $WS_1 - WS_2$ | $AS_1$ | $AS_2$ | $DB_1$ | $DB_2$ | $DB_3$ |
|---|---|---|---|---|---|---|
| 0 | 2 | 2 | 2 | 2 | 2 | 2 |
| 1 | | | | 3 | | |
| 2 | 4 | | | | | |
| 3 | | | 1 | | | |
| 4 | | | | 10 | | |
| 5 | | | | | | |
| 6 | | | | | | |
| 7 | | | | 7 | | |
| 8 | | 1 | | | | |
| 9 | 1 | | | | | |
| 10 | | 4 | | 7 | 15 | 15 |
| 11 | | | 7 | | | |
| 12 | | | | | | |

Figure 11

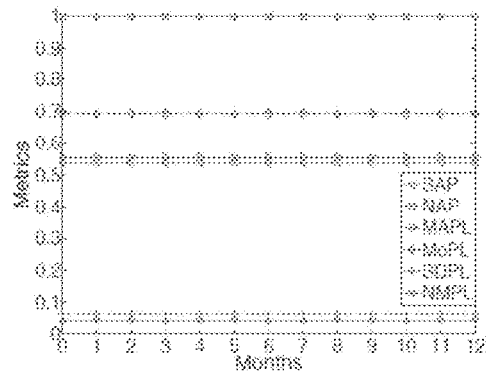
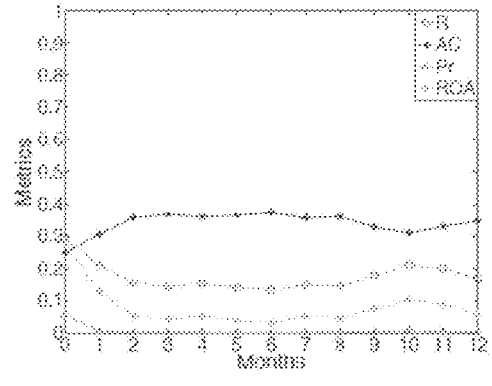
Figure 15A  Figure 15B
Table 9: Scenario I and Scenario II.
| Scenario I | | | Scenario II | |
|---|---|---|---|---|
| Group A | Group B | Group C | Group A | Group B |
| NAP | AC | SAP | NAP | AC |
| MAPL | pr | | MAPL | pr |
| MoPL | ROA | | MoPL | ROA |
| SDPL | | | SDPL | R |
| R | | | SAP | |
Figure 16

TABLE I: General notations used

| notations | Descriptions |
|---|---|
| $T$ | is a time window |
| $NS$ | is a set of network states |
| $nc_j$ | is a network components $nc_j$ (e.g., hosts, edges) |
| $OC_{nc_j}$ | is the observed count for $nc_j$ in a time window $T$ |
| $t(nc_j)$ | is the time duration of a network component $nc_j$ per state |
| $nc_j^\alpha$ | is the weight value for $nc_j$ |
| $h_i$ | is a network host $h_i$ |
| $h_i^\alpha$ | is a host with weight value $\alpha$ |
| $e_j$ | is a network edge $e_j$ |
| $e_j^\alpha$ | is an edge with weight value $\alpha$ |
| $pr_h$ | the probability of an attacker to successfully compromise $h$ |
| $mpl_h$ | the maximum potential loss caused by an attacker host $h$ |
| $ap$ | is an attack path which includes a sequence of $h$ |
| $AP$ | is the set of attack paths |
| $r_{ap}$ | is the path level risk |

Figure 19

TABLE II: The calculated weight values for hosts

| Host name ($nc_j$) | $AS_1$ | $AS_2$ | $WS_1$ | $WS_2$ | $U_1$ | $U_2$ | $U_3$ | $U_4$ | $DB$ |
|---|---|---|---|---|---|---|---|---|---|
| $OC_{nc_j}$ | 6 | 6 | 6 | 5 | 6 | 6 | 2 | 3 | 6 |
| $\sum_{i=1}^{|NS|} t(nc_j)$ | 24 | 24 | 24 | 19 | 24 | 24 | 6 | 14 | 24 |
| $\frac{OC_{nc_j}}{|NS|}$ | 1 | 1 | 1 | 0.83 | 1 | 1 | 0.33 | 0.5 | 1 |
| $\frac{\sum_{i=1}^{|NS|} t(nc_j)}{T}$ | 1 | 1 | 1 | 0.79 | 1 | 1 | 0.25 | 0.58 | 1 |
| $\left(\frac{OC_{nc_j}}{|NS|} \times \frac{\sum_{i=1}^{|NS|} t(nc_j)}{T}\right) \times 100$ | 100 | 100 | 100 | 66 | 100 | 100 | 8.33 | 29 | 100 |

Figure 20

TABLE III: The calculated weight values for edges

| Edges $(ne_j)$ | $OC_{ne_j}$ | $\sum_{i=0}^{|NS|} t(ne_j)$ | $\frac{OC_{ne_j}}{|NS|}$ | $\frac{\sum_{i=0}^{|NS|} t(ne_j)}{7}$ | $\left(\frac{OC_{ne_j}}{|NS|} \times \frac{\sum_{i=0}^{|NS|} t(ne_j)}{7}\right) \times 100$ |
|---|---|---|---|---|---|
| $(U_1, AS_1)$ | 6 | 24 | 1 | 1 | 100 |
| $(WS_2, AS2)$ | 5 | 19 | 0.83 | 0.79 | 65.97 |
| $(U_4, AS2)$ | 3 | 14 | 0.50 | 0.58 | 29.16 |
| $(WS_1, U_1)$ | 6 | 24 | 1 | 1 | 100 |
| $(WS_2, U_3)$ | 2 | 6 | 0.33 | 0.25 | 8.33 |
| $(U3, AS_1)$ | 2 | 6 | 0.33 | 0.25 | 8.33 |
| $(WS_2, U2)$ | 5 | 19 | 0.83 | 0.79 | 65.97 |
| $(U2, AS_1)$ | 6 | 24 | 1 | 1 | 100 |
| $(U2, AS2)$ | 6 | 24 | 1 | 1 | 100 |
| $(AS_1, DD)$ | 6 | 24 | 1 | 1 | 100 |
| $(AS_2, DD)$ | 6 | 24 | 1 | 1 | 100 |
| $(WS_1, AS_1)$ | 6 | 24 | 1 | 1 | 100 |
| $(WS_1, U2)$ | 2 | 9 | 0.33 | 0.38 | 12.34 |
| $(WS_1, U3)$ | 1 | 2 | 0.16 | 0.083 | 1.33 |
| $(WS_1, U4)$ | 3 | 14 | 0.50 | 0.58 | 29.26 |

Figure 21

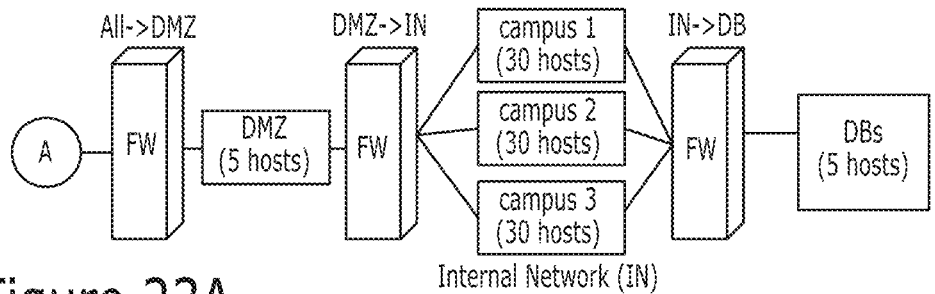
Figure 23A
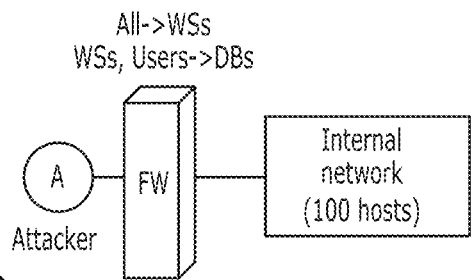
Figure 23B
TABLE IV: The hosts OSes and their vulnerability information use
| OS | CVE ID | CVSS BS |
|---|---|---|
| Windows 10 | CVE-2017-8589 | 10.0 |
| Redhat Enterprise Linux | CVE-2017-9953 | 5.0 |
| Windows 8 | CVE-2017-8464 | 9.3 |
| Ubuntu | CVE-2015-5479 | 4.3 |
Figure 24

$S$: a set of all network states;
for $s \in S$ do
  if *components of $s_i$ not in $s_{init}$* then
    $s_{init} = s_{init} \cup s_i$;
  end
end
Assess the security of $s_{init}$;

Figure 28

$S$: a set of all network states;
$t_i$: a time duration of $s_i$;
$T$, the total duration of $S$;
$m_{init}$: a security metric to be computed;
for $s \in S$ do
  $m_i \leftarrow$ security assessment of $s_i$;
  $m_{init} = m_{init} + (m_i \times \frac{t_i}{T})$;
end
return $m_{init}$;

Figure 29

Table I
EXPERIMENTAL RESULT

| States | Risk | Weighted Risk | Optimal Patch |
|---|---|---|---|
| $s_1$ | 42.8 | 5.8 | $v_{10}$ |
| $s_2$ | 104.3 | 11.4 | $v_3$ |
| $s_3$ | 67.4 | 6.5 | $v_3$ |
| $s_4$ | 91.9 | 11.4 | $v_3$ |
| $s_5$ | 122.4 | 15.4 | $v_{11}$ |
| $s_6$ | 90.7 | 29.5 | $v_{11}$ |
| $s_7$ | 90.7 | 29.5 | $v_{11}$ |
| $s_8$ | 90.7 | 29.5 | $v_{11}$ |
| $s_{init}$ | 185.6 | 5.8 | $v_{11}$ |
| sum | - | 139.0 | - |

Figure 30

METHODS AND SYSTEMS FOR MONITORING NETWORK SECURITY

The present application claims the benefit of Provisional Application No. 62/595,307 filed Dec. 6, 2017 which is hereby incorporated by reference therein.

BACKGROUND

The present invention relates to methods and systems for monitoring network security. The present invention more particularly relates to methods and systems for monitoring the security of a dynamic computing network.

Modern networks are becoming more and more dynamic, such as frequent changes compared to the traditional static networks (e.g. hosts addition and removal, vulnerability change, applications and services update, attack surface change). As network components change over time, the security posture of the network also changes, as vulnerabilities associated with the network components are shifting. Hence, it is of paramount importance to be able to assess the security of dynamic networks in order to understand and further enhance the security.

One widely used approach is to use a graphical security model (GSM) (e.g., attack graphs (AGs) and attack trees (ATs)), which provide formal methods to systematically assess the security using various security metrics. However, most existing GSMs do not take into account the changing nature of the dynamic networks, and to the best of our knowledge, no GSM captures the changing security posture of dynamic networks. For instance, in enterprise networks, there are nodes (e.g., hosts) and edges (e.g., links connecting nodes). For each node, the applications and operating systems running on the nodes may have vulnerabilities. Using new networking technologies such as cloud, software-defined networking (SDN) and Internet of Things (IoT), these components are changing over time (e.g., virtual machine (VM) migration, Flow table rule changes in the SDN etc.). For instance, networks are usually dynamic with changes in their settings and configurations over time, where such changes may affect the topology, the number of hosts (addition and removal), availability of network services, etc. As consequence, new sets of attack vectors may be introduced or removed that changes the security posture of the dynamic network each time. However, such changes cannot be captured in existing GSMs.

Security metrics also cannot capture the changes in security posture when the network changes. For example, the security metrics can only be used for static networks, as any changes in the network would result in inaccurate metric calculations. As a result, it becomes infeasible to evaluate the security of modern networks that are dynamic. To cope with this problem, existing GSMs would have to re-analyzed the security posture when the change has happened, and repeating this process for highly dynamic networks becomes inefficient, especially for a large sized network (e.g. enterprise).

Therefore, a new approach that can capture such changes and reflect the changed security posture is needed in order to precisely assess the security of dynamic networks.

There is a need for an improved method and system for monitoring network security.

SUMMARY

According to one aspect of the present invention, there is provided a computer-implemented method for monitoring the security of a computing network, wherein the network comprises components which include a plurality of hosts and a plurality of edges which link connected hosts, and wherein the method comprises: capturing first network state information at a first time; storing the first network state information in a memory; capturing second network state information at a second time; and storing the second network state information in the memory, wherein each of the first and second network state information comprises: reachability information for at least one of the hosts, the reachability information being stored in an upper layer of a graphical security model (GSM); and vulnerabilities information providing information about at least one vulnerability in at least one of the hosts or the edges, the vulnerabilities information being stored in a lower layer of the GSM; wherein the method further comprises:

comparing, using a processing system, the first and second network state information; detecting, using the processing system, a change in the security of the network during the time window between the first and second times; and storing, in the memory, security change data which is indicative of the change in the security of the network during the time window for a user to monitor the change in the security of the network.

In some embodiments, the computing network is a dynamic network in which the configuration of at least one of the hosts or the edges changes over time.

In some embodiments, the dynamic network is a network selected from a group including a cloud computing network, a software defined networking (SDN) arrangement or an Internet of Things (IoT) network.

In some embodiments, the method further comprises: capturing and storing network state information in response to at least one of a time-driven trigger, an event-driven trigger or a user-driven trigger.

In some embodiments, detecting a change in the security of the network comprises detecting at least one of: the addition of a new host to the network; the removal of a host from the network; the addition of a new edge to the network; the removal of an edge from the network; the addition of a vulnerability to a host in the network; or the removal of a vulnerability from a host in the network.

In some embodiments, the method further comprises: calculating, using the processing system, at least one security metric for the network at the first time and at the second time.

In some embodiments, the method further comprises: calculating a weight value for at least one of the components in the network, the weight value being indicative of the visibility of the component in the network over a predetermined period of time.

In some embodiments, the method further comprises: calculating the weight value using the equation:

$$nc_j^\alpha = \left( \frac{OC_{nc_j}}{|NS|} \times \frac{\sum_{i=0}^{|NS|} t(nc_j)}{T} \right) \times 100$$

In some embodiments, the method further comprises: constructing a 4-tuple, (U, L, C, w) based on the calculated weight value of a component that is less than or equal to a predetermined weight value threshold w, where U is the upper layer which models a set of hosts H and their reachability information and L is the lower layer that models the set of vulnerabilities V for each host $h_t \in H$ respectively.

In some embodiments, the method further comprises: defining a mapping between the upper and lower layers as: $C \subseteq \{(h_i \leftrightarrow AT)\} \forall h_i \in U, AT \in L$ In some embodiments, the method further comprises: defining the upper layer as a 3-tuple (H, E, w), where H is a finite set of weighted hosts in the network where $h_i \in H$ and $h_i^\alpha \leq w$, $E \subseteq H \times H$ is a set of weighted edges where $e_i \in E$ and $e_i^\alpha \leq w$, and v is the weight threshold value.

In some embodiments, the method further comprises: defining the lower layer as a 5-tuple (A, B, C, g, root), where $A \subseteq V$ is a set of vulnerabilities, $B = \{b^1, b^2, \ldots\}$ is a set of gates, $c \subseteq \{b^j \to e_i\} \forall b^j \in B, e_i \in A \cup B$ is a mapping of gates to vulnerabilities and other gates, $g \subseteq \{b^j \to \{AND, OR\}\}$ specifies the type of each gate, and root $\in A \cup B$ is the root node of the AT.

According to another aspect of the present invention, there is provided a computer program product comprising instructions which, when executed by a computing system, cause the computing system to perform the method of the present invention as defined hereinafter.

According to another aspect of the present invention, there is provided a computer readable medium storing instructions which, when executed by a computing system, cause the computing system to perform the method of the present invention as defined hereinafter.

According to another aspect of the present invention, there is provided a system for monitoring the security of a computing network, wherein the system comprises a processor and a memory and the system is configured to perform the method of the present invention as defined hereinafter.

BRIEF DESCRIPTION OF THE DRAWINGS

So that the present invention may be more readily understood, embodiments of the present invention will now be described, by way of example, with reference to the accompanying drawings, in which:

FIG. 3 is a table showing a network routing table,

FIG. 4 is a table showing notations used in a security metrics computation,

FIG. 5 is a table showing security metrics,

FIG. 6 is a table showing the categorisation of network changes,

FIG. 7 is a table showing network centrality measures of an enterprise network, FIG. 8 is a table showing a list of vulnerabilities for scenario I, FIG. 11 is a table showing a list of vulnerabilities for scenario II, FIGS. 15A and 15B are graphs illustrating the effect of change with respect to vulnerability on security metrics for scenario II, FIG. 16 is a table showing groups of the results from scenario I and scenario II, FIG. 19 is a table showing general notations that are used in connection with some embodiments, FIG. 20 is a table showing example calculated weight values for hosts, FIG. 21 is a table showing example calculated weight values for edges, FIGS. 23A and 23B are schematic diagrams of another example network, FIG. 24 is a table showing example operating systems and vulnerability information for hosts, FIG. 28 shows an Algorithm 1 for a visibility aggregation (VA) approach, FIG. 29 shows an Algorithm 1 for a weighted aggregation (WA) approach, and FIG. 30 is a table showing experimental results.

DETAILED DESCRIPTION OF PREFERRED EMBODIMENTS

Figures 1, 2:
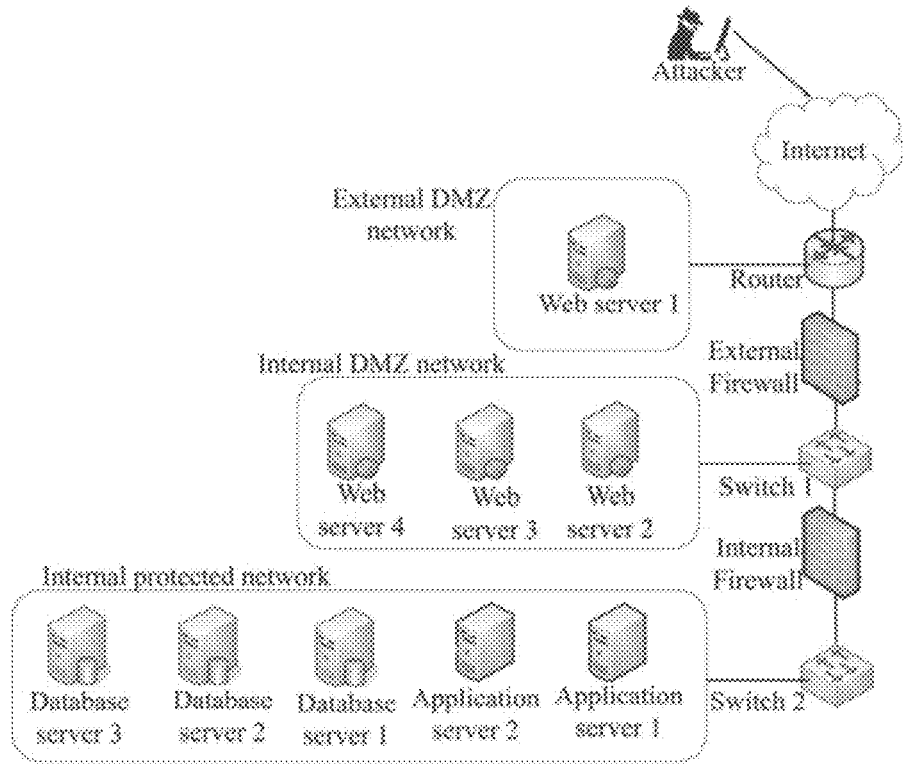
FIG. 1 is a schematic diagram of an example enterprise network.
FIG. 2 is a table showing example operating systems and services in hosts.

To address the aforementioned problems, the inventors developed a new GSM named Temporal-Hierarchical Attack Representation Model (T-HARM), a temporal graph-based GSM using hierarchies for capturing different network components onto different layers. As a T-HARM is a temporal graph-based GSM, it can capture and model the changing effects of dynamic networks for an in-depth security analysis. Embodiments that use this approach are the first to use a temporal graph-based approach in conjunction with the GSM (in particular, Hierarchical Attack Representation Model (HARM)) to model and analyze the security of dynamic networks.

To understand the security posture of dynamic networks in detail, GSMs must take into account the details of dynamic changes (i.e. network changes and the relationships/differences between network states). In the following description, the term "network state" refers to the configurations of a network at a given time.

There are some conventional methods and techniques which attempt to assess the security of dynamic networks. However, these conventional methods do not capture all attributes of the dynamic networks and therefore the security analysis may not be complete. In order to perform a complete security assessment for dynamic networks, one must take into account all observable attributes of dynamic networks, which includes changes of vulnerabilities, network components, and the connectivity of network components (e.g. changes in host-to-host reachability as a result of users' activities).

There are three main approaches to capture changes using the GSM for dynamic networks, which are time-driven, event-driven or user-driven. In the case of the time-driven approach, the GSM is constructed at predefined times. In the case of the event-driven approach, the GSM is constructed when changes have been detected. In the case of the user-driven approach, a user decides which times the GSM is constructed. These approaches can be used to generate multiple GSM snapshots, with each snapshot with different security properties for that particular network state within a given time window. However, existing GSMs lack methods and techniques to represent the overall security posture of dynamic networks using a representative metric value.

Some embodiments provide a new GSM named Time-independent Hierarchical Attack Representation Model (Ti-HARM) to systematically assess the overall security of dynamic networks. The technical effect is to capture temporal network states at various times, and then aggregate them taking into account the attributes of the dynamic network. The Ti-HARM not only assesses the security of each network state, but also identifies and assesses all potential attack paths in the multiple network states, as well as attack events happening over multiple network states. These embodiments are the first approach to aggregate network states for security modelling and analysis for the dynamic network taking into account various dynamic attributes.

In one example, a system model comprises an enterprise network, which consists of three subnets (external Demilitarised Zone (DMZ) network, Internal DMZ network and internal network). These subnets are connected via firewalls, which also regulate what network traffic is allowed and denied. The external DMZ subnet connects to the Internet via the enterprise boundary router, where the boundary router is configured to allow direct connections from the outside world only to the external DMZ (i.e., all packets from the outside to Internal DMZ and internal network are dropped). The internal DMZ and internal network are protected by external and internal firewalls, respectively (the external firewall only allows traffic from the external DMZ network to the internal DMZ). Further, we assume that there may be a remote user from the outside connected to the internal network. Such users cannot direct access the database server located in the internal network. For example, an application server in the internal DMZ can request data from the database server in the internal network, but not the remote user. In some embodiments, the enterprise network topology is a bus topology and there are nine hosts in the network; but, other embodiments are configured to operate with greater or fewer numbers of hosts in the network.

The aim of some embodiments is to investigate how security metrics change when vulnerabilities change over time in the dynamic network environment (for example, when there is a new vulnerability on a host and the other existing vulnerabilities are patched, how does it affect security metrics?)

In this example, different operating systems (OSs) and different applications are assigned on each host as shown in the table in FIG. 2. We denote web server, application server and database server as WS, AS and DB, respectively. The table in FIG. 3 shows the enterprise network routing rules.

Attacker Model

There are many different attack types with different characteristics. For simplicity, the following description only considers a targeted attack scenario, where the goal of the attacker is to compromise certain target hosts in the network. In the following description, we assume there is only one attacker (although multiple attackers can be modelled) and the attacker is located outside the network. For the example, the goal of the attacker is to gain unauthorized access on the designated target host (i.e., DB3). We assume the attacker cannot attack the target host directly in the network, as constrained by the network rules. We also assume that once an attacker successfully compromises a host, the attacker can gain the root privilege of the host and subsequently attack the next host in the network until the target host is reached. Further, the attacker knows about all the vulnerabilities (such vulnerabilities can be found using scanners such as Nessus, Nmap, etc). We only consider vulnerabilities for the services in the table in FIG. 2 (the OS vulnerabilities can also be modelled) for simplicity, but all vulnerabilities can be modelled for a full security analysis.

T-HARM

An objective of T-HARM of some embodiments is to analyze the security of dynamic networks and investigate the effects of existing security metrics with respect to changes to the security posture when the network changes. T-HARM is an extension of a GSM named HARM. Some embodiments adopt the idea of a temporal graph, and extend each state of the temporal graph to capture the security posture of the network state using the HARM. Here, the term network state refers to the network configuration of its components such as the topology, host and its details etc. Some embodiments use a two layer Temporal-Hierarchical Attack Representation Model (T-HARM) to capture the dynamic security information. The temporal host(s) reachability information is captured in the upper layer while the changing vulnerabilities information is captured in the lower layer. This two-layer information is used as inputs to the T-HARM.

The T-HARM implementation of some embodiments will now be described in terms of the network states, host and vulnerability information during a time-window [0, T], and then define the T-HARM.

Given $t_i$ (where i=1, 2, . . . , n), a discrete time in a time window T, T-HARM for some embodiments is defined as follows.

Definition 1 T-HARM is a 3-tuple T-HARM=(S, H, V), where $S=\{s_{t_0}, s_{t_1}, \ldots, s_{t_n}\}$ is a set of HARM for each network snapshot at time $t_i$, $H=\{h_0, h_1, \ldots\}$ is a set of all hosts in the network, and $V=\{v_0, v_1, \ldots\}$ is a set of all vulnerabilities in the network. $H_{t_i} \subseteq H$ is a set of hosts only in the network snapshot at time $t_i$, and $V_{t_i} \subseteq V$ is a set of vulnerabilities only in the network snapshot at time $t_i$.

In addition, the HARM for each discrete time $t_i$ is defined as follows.

Definition 2 A HARM, $s_{t_i} \in S$ is a 3-tuple $s_{t_i}=(U_{t_i}, L_{t_i}, C_{t_i})$, where $U_{t_i}$ is the upper layer (dynamic AG) that models the set of hosts $H_{t_i}$, and $L_{t_i}$ is the lower layer (dynamic ATs) that models the set of vulnerabilities $V_{t_i}$ for each host $h \in H_{t_i}$, respectively. The mapping between the upper and the lower layers is defined as $C_{t_i} \subseteq \{(h_j \leftrightarrow at_{t_i,k})\} \forall h_j \in U_{t_i}, at_{t_i,k} \in L_{t_i}$ (here, k=1, 2, . . . denotes a distinct attack tree $at_{t_{i,k}}$ in the lower layer).

The attributes; the set of HARMs S, the set of hosts H, and the set of vulnerabilities V are described as follows:

Each HARM $s_{t_i} \in S$ has a set of hosts $s_{t_i}^{hosts} \subseteq H_{t_i}$, a set of vulnerabilities $s_{t_i}^{vuls} \subseteq V_{t_i}$, a set of metrics $s_{t_i}^{metrics} \in \{$attack cost, attack risk, return on investment (ROI), . . . $\}$, a topology information $s_{t_i}^{topo} \in \{$bus, tree, . . . $\}$.

Each host $h_j \in H_{t_i}$ has a set of adjacent hosts $h_j^{adj} \subseteq H_{t_i}$, a set of vulnerabilities $h_j^v \subseteq V_{t_i}$, and a set of security metrics $h_j^{metrics} \in \{$attack cost, attack risk, ROI, . . . $\}$.

Each vulnerability $v_k \in V_{t_i}$ has a privilege level that is acquired by the attacker after the vulnerability is successfully exploited $v_k^{privilege} \in \{$root, user, . . . $\}$ and a set of security metrics $v_k^{metrics} \in \{$attack cost, attack risk, . . . $\}$.

Definition 3 A dynamic AG is a directed graph $U_{t_i} = ag_{t_i} = (H_{t_i}, E_{t_i})$ at time $t_i$, where $H_{t_i}$ is a finite set of hosts and $E_{t_i} \subseteq H_{t_i} \times H_{t_i}$ is a set of edges. Let Z be a sequence of attacker's snapshots which include one or multiple attackers and $z \in Z$ is a sequence of snapshots $z_{t_0}, z_{t_1}, \ldots, z_{t_n}$, where n is the total number of snapshots, $Z \not\in S$ and $Z_{hosts} \# H_{t_i} = \emptyset$. The representation of the upper layer is given by $H_{t_i} \subseteq S \cup Z$ and $E_{t_i} \subseteq (S \cup Z) \times S$.

Definition 4 A dynamic AT is a 5-tuple $at_{t_i,k} = (A_{t_i,k}, B_{t_i,k}, c_{t_i,k}, g_{t_i,k}, root_{t_i,k})$, where $L_{t_i} = \{a_{t_i,1}, a_{t_i,2}, \ldots a_{t_i,k}, \ldots\}$ at time $t_i$. Here, $A_{t_i,k} \subseteq V_{t_i}$ is a set of vulnerabilities, $B_{t_i,k} = \{b_{t_i,k}^1, b_{t_i,k}^2, \ldots\}$ is a set of gates, $c_{t_i,k} \subseteq \{b_{t_i,k}^j \to e_l\} \forall b_{t_i,k}^j \in B_{t_i,k}, e_l \in A_{t_i,k} \cup B_{t_i,k}$ is a mapping of gates to vulnerabilities and other gates, $g_{t_i,k} \subseteq \{b_{t_i,k}^j \to \{AND, OR\}\}$ specifies the type of each gate, and $root_{t_i,k} \in A_{t_i,k} \cup B_{t_i,k}$ is the root node of the $at_{t_i,k}$.

The gates {AND, OR} have relationships to vulnerabilities and other gates that establish the connection $c_{t_i,k}$ (the vulnerability of a host are combined using AND and OR gates).

Figure 12:
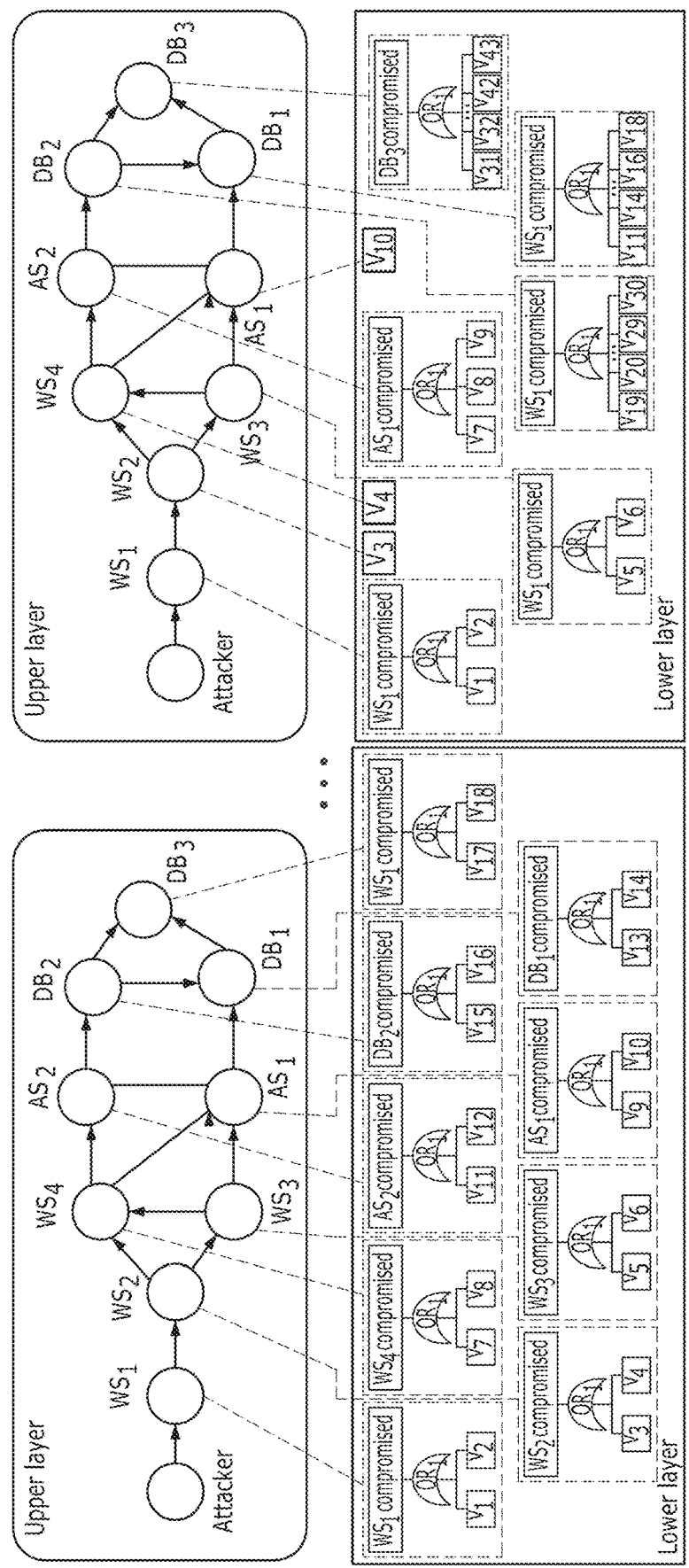
FIG. 12 is a diagram illustrating the Temporal-Hierarchical Attack Representation Model (T-HARM) for scenario II.
Figure 13A:
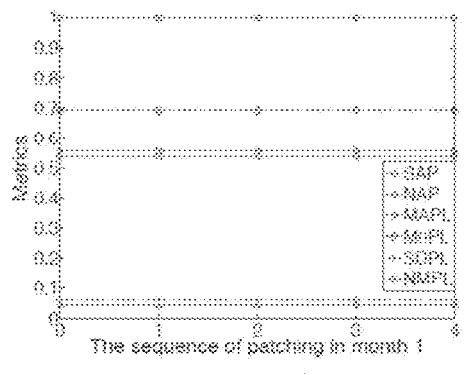
FIGS. 13A and 13B are graphs illustrating the effect of change with respect to vulnerability during a first month.
Figure 13B:
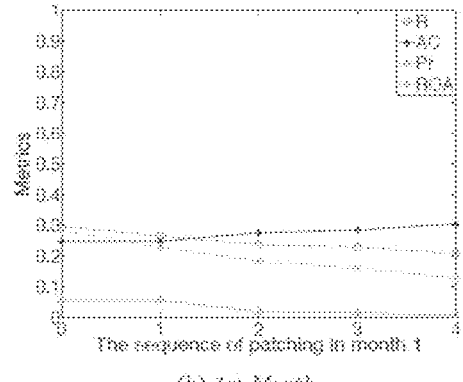
Figure 14A:
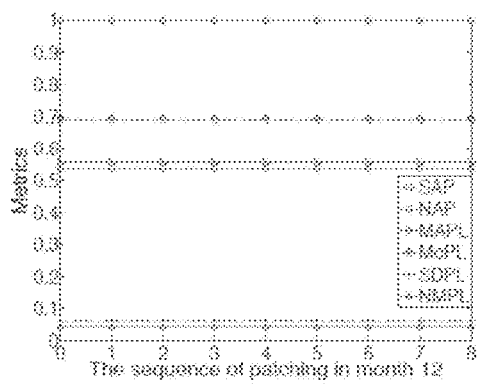
FIGS. 14A and 14B are graphs illustrating the effect of change with respect to vulnerability during a twelfth month.
Figure 14B:
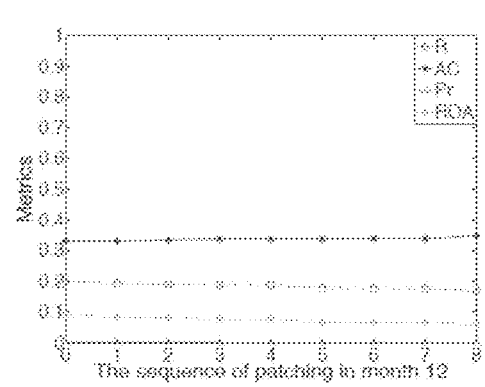

Example 1. The mapping between the upper and lower layer components: FIG. 12 shows T-HARM of the enterprise network. The T-HARM at time $t_{12}$ is $HARM_{t_{12}} = (U_{t_{12}}, L_{t_{12}}, C_{t_{12}})$, where $U_{t_{12}}$ and $L_{t_{12}}$ are the AG and the set of ATs in the upper and the lower layer at $t_{12}$, respectively, and $$C_{U_{t_{12}}, L_{t_{12}}}: U_{t_{12}} \to L_{t_{12}}$$

is a one-to-one mapping of the upper layer $U_{t_{12}}$ to the corresponding lower layer $L_{t_{12}}$.

Example 2. The Upper Layer Components: At $t_{12}$, the AG in the upper layer is shown in FIG. 12. The AG is a directed graph $ag_{t_{12}} = (H_{t_{12}}, E_{t_{12}})$, where $H_{t_{12}} = \{(attacker, WS_1), (WS_1, WS_2), (WS_2, WS_3), (WS_2, WS_4), (WS_3, WS_4), (WS_3, AS_1), (WS_4, AS_1), (WS_4, AS_2), (AS_1, DB_1), (AS_1, AS_2), (AS_2, DB_2), (DB_1, DB_3), (DB_2, DB_1), (DB_2, DB_3)\}$.

Example 3. The Lower Layer Components: At $t_{12}$, the ATs in the lower layer is shown in FIG. 12. The set of conditions required to compromise $WS_1$ at $t_{12}$ is given by $L_{t_{12}}^{WS_1} = (A_{t_{12}}^{WS_1}, B_{t_{12}}^{WS_1}, c_{t_{12}}^{WS_1}, g_{t_{12}}^{WS_1}, root_{t_{12}}^{WS_1})$ where $A_{t_{12}}^{WS_1} = \{v_1, v_2\}$ is a set of components which are the leaves (vulnerabilities), $B_{t_{12}}^{WS_1} = OR_1, c_{t_{12}}^{WS_1}(OR_1) = \{v_1, v_2\}, g_{t_{12}}^{WS_1}(root_{WS_1}) = OR_1$ and $root_{t_{12}}^{WS_1} = root, root \in A_{t_{12}}^{WS_1} \cup B_{t_{12}}^{WS_1}$.

Security Metrics

Relative to the Common Vulnerability Scoring System (CVSS) base score some embodiments assume and assign probability, impact and cost value to each vulnerability to perform security analysis. Some embodiments use the enterprise network in FIG. 1 to evaluate two different scenarios. Scenario I is a network with only one vulnerability on each host while Scenario II is a network that is having multiple vulnerabilities (the vulnerabilities in this scenario are as reported by National Vulnerability Database). Security metrics may be calculated as shown in the table in FIG. 5. Some embodiments use the following security metrics and denote them as: Risk on attack path(s) as R, Return on attack path(s) as ROA, Cost on attack path(s) as AC, Standard deviation of attack path lengths [4] as SDPL, Probability of attack success on path(s) as Pr, normalized mean of attack path lengths [4] as NMPL [4], Mean of attack path lengths [17] as MAPL, Mode of attack path lengths [4] as MoPL, Number of attack paths [16] as NAP and shortest attack path [13, 16] as SAP. Each of the metric can have a time $t_i$. The notations in the table in FIG. 4 are used to compute the security metrics in the table in FIG. 5.

Categorization of Network Changes

In the enterprise networks, there are hosts and edges (i.e., links connecting hosts). For each host, there are applications and OS running on it and these components are also with vulnerabilities (i.e., security weaknesses). The status of the hosts, edges, applications, OSes and vulnerabilities can be affected by the activities of the users, network administrators and even other events not under the control of the administrators (e.g., software ageing, discovery of a new vulnerability, etc). Hence, the network configuration is changing continuously.

Here, since changes in network configuration can change the security posture of networks, the causes of network changes and the possible security changes w.r.t. to a GSM are identified, then the network changes are categorized into two main categories which are; "change in host" and "change in edges (reachability)" (in the table in FIG. 6). The possible types of security changes are:

(1) Addition of host (AN)
(2) Removal of host (RN)
(3) Addition of edge (AE)
(4) Removal of edge (RE)
(5) Addition of vulnerability (AV), and
(6) Removal of vulnerability (RV)

Further, the method of some embodiments correlates their relationships (i.e., the network changes to the security changes) and show them in the table in FIG. 6. For example, the update of a host software can possibly remove existing vulnerability (i.e., patched), remove a connection (i.e., a reachable attack path), or remove a host from the network (if the node has no vulnerability).

Simulation and Results

The following simulations were conducted to investigate the effect of network security change on the existing security metrics. In the simulation, two possible scenarios are considered: (i) presence of new vulnerabilities and (ii) patching of vulnerabilities. For the vulnerabilities use in the simulations, we collect them from a repository NVD. In real networks, such information is collected using scanners (such as Nmap, OpenVAS, etc). FIG. 1 shows the enterprise network used for the simulation.

Two Scenarios

Scenario I. This scenario uses the network and system settings described above. Firstly, we assume and assign one vulnerability to each host. Secondly, we use a hybrid method to determine the order of vulnerabilities to patch. The hybrid method computes combined importance measures values; we combine the CVSS base score and three Network Centrality Measures (NCMs) (degree, closeness and betweenness). We normalized the CVSS base score and the NCMs values. The normalized NCM and the CVSS base score values for the enterprise network is summarized in the table in FIG. 7. The list of the vulnerabilities with the metrics used is shown in the table in FIG. 8. We denote the combined important measures value as $CV_v$. We calculated the $CV_v$ for each vulnerability v as in equation (1) [2], where $0 \leq \alpha \leq 1$ is a weight value. We reasonably selected a weight value of $\alpha = 0.5$. We denoted the vulnerability as v, the NCM value for host containing vulnerability v as $NS_v$, and the security metric for vulnerability v as $VS_v$ (we normalized and use CVSS base score as the metric).

$$CV_v = \alpha NS_v + (1-\alpha) VS_v \quad (1)$$

Figure 9:
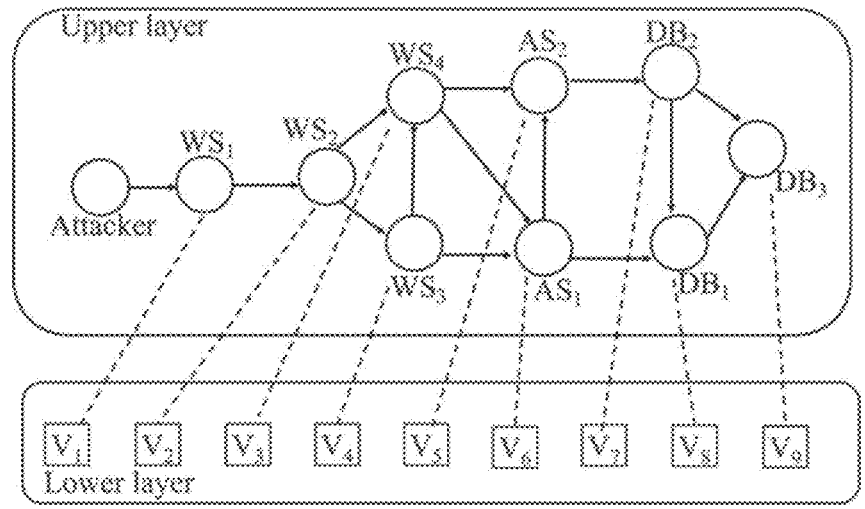
FIG. 9 is a diagram illustrating the Hierarchical Attack Representation Model (HARM) for scenario I.

Some embodiments use a HARM to statically model and analyze the security. HARM is a two layer model in which the upper layer represents the network reachability information and the lower layer represents the vulnerability information respectively. The HARM of this scenario is shown in FIG. 9. In this simulation, we rank all the vulnerabilities based on the $CV_v$. Then we patch only one vulnerability at a time (independently) from the highest risk $CV_v$ to the lowest one. However, the vulnerabilities on the host $WS_1$, $WS_2$ and $DB_3$ are not patched because if these hosts are patched all the possible attack paths to the target host would be lost.

Figure 10A:
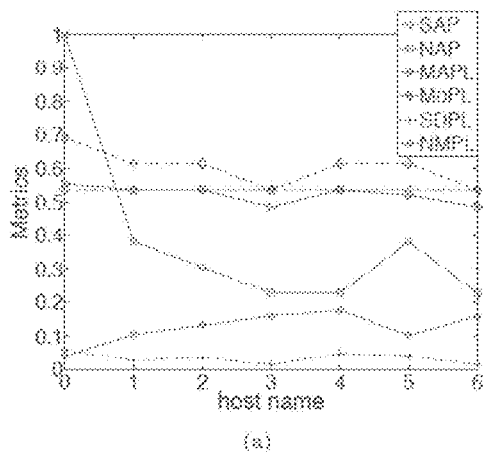
FIGS. 10A and 10B are graphs illustrating the effect of change with respect to vulnerability metrics for scenario I.
Figure 10B:
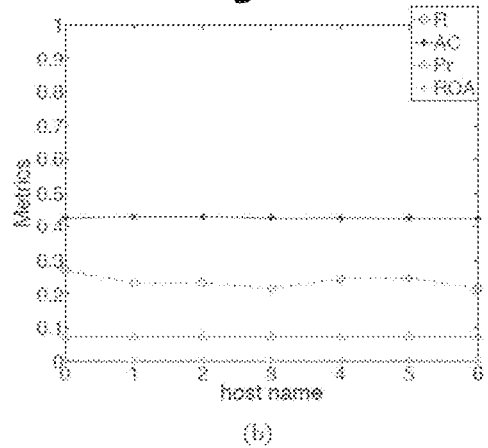

Scenario I. FIG. 10A and FIG. 10B show the effects of change w.r.t. vulnerabilities on security metrics. We observed that all the security metrics in FIG. 3 shows a small change in their values. The shortest attack path metric only remains constant throughout the time period.

Taking into account the security metrics shown in FIG. 10B, the risk on attack path(s) shows a small change in its value. The other metrics only show negligible changes. In summary, all the security metrics considered in this scenario showed some level of changes in their values except the shortest attack path metric (This is because the shortest distance from the attacker to the target host remains the same for all the time).

Scenario II. In this scenario, changes in vulnerabilities are modeled over time. This scenario uses the same enterprise network in FIG. 1 to perform simulation. The scenario only models the vulnerabilities for the WS, AS and DB in the table in FIG. 2. In order to model a real world vulnerability scenario, vulnerability data was collected for 12 months (i.e., from April, 2015 to March, 2016) from the National Vulnerability Database (NVD). The NVD is the US government repository of standards based vulnerability management data. These data enables automation of vulnerability management, security assessment, and compliance.

In the beginning of the simulation, each host in the initial network configuration is assumed to have two exploitable vulnerabilities (the hosts are randomly selected and assigned the initial vulnerabilities). Conversely, for the subsequent vulnerabilities in the network configurations, the vulnerabilities are captured and populated (in sequence) as they are discovered and published in the NVD. We only consider vulnerabilities associated with the specific version of the services we have selected (the selected versions are provided in Table 1). We organized the collected vulnerabilities into their respective time of discovery and then used them for the simulation.

This scenario uses T-HARM for the simulation. FIG. 12 shows the T-HARM for this scenario (only the initial and final T-HARM snapshots are shown). The following description describes how the order of vulnerabilities to be patched is determined in the simulation (which is based on their damaging effects in the enterprise network).

Computing Prioritized Set of Vulnerabilities

Generally, the improvement of security (e.g., patching of vulnerabilities) comes with cost and time requirements due to the number of vulnerabilities found and reported daily. To determine what vulnerability to patch first we compute risk based prioritized set of vulnerabilities (PSV) using the Hybrid method. The risk based PSV using the hybrid method used a combination of NCM (e.g., degree, closeness and betweenness) to rank important hosts in the network, and security metrics (e.g., risk, CVSS base score) to rank important vulnerabilities in a host. The values are normalized and combined using a weight value. The normalized NCM values for the enterprise network is shown in the table in FIG. 7. We calculated the combined important measures value ($CV_v$) for each vulnerability v as in equation (1). We reasonably selected a weight value of $\alpha=0.5$ and PSV=15% (we will perform more experiments in the future with different $\alpha$ and PSV values on a large network). We denoted the vulnerability as v, the NCM value for host containing vulnerability v as $NS_v$, and the security metric for vulnerability v as $VS_v$ (we normalized and use CVSS base score as our risk metric).

Scenario II: The results of this scenario is shown in FIGS. 13A, 13B, 14A and 14B. When we observed how the security metrics change for every month (i.e., month 1 month 12), we found that six of the security metrics (i.e., SAP, NAP, MAPL, MoPL, SDPL and NMPL) did not change for all the time that new vulnerabilities are discovered and when a set of vulnerabilities is patched (i.e., at PSV—15%). This is because there is still at least one exploitable vulnerability remaining on each host in the network and as a result the structure of the AG in the upper layer did not change. Conversely, four of the security metrics (i.e., R, AC, Pr and ROA) shows change in their values (due to the page limit, we have only shown how the security metrics change for the first and the last month in FIGS. 13A, 13B, 14A, and 14B, respectively. However, we have observed that the security metrics showed the same trend (as in FIGS. 13A, 13B, 14A and 14B).

When we observed how the security metrics change for the entire period of twelve months (in FIGS. 15A and 15B) we noticed that the security metrics in FIG. 15A did not change for the whole period (this is because each host in the network still has at least one exploitable vulnerability on them). On the other hand, the security metrics in FIG. 15B change continuously (this is because the addition of vulnerabilities on host Z or patching of vulnerabilities on host Z changes the host AT and the security metric).

The existing security metrics response to changes differently (i.e. when time is introduced to them). We group the results of our simulations in the table in FIG. 16. In Scenario 1, the group A metrics show small changes in their values. While the group B metrics showed very negligible changes in their metric value. While the group C metric did not change for the entire time period.

From the result in FIGS. 10A and 10B it shows that the group A security metrics can be used to assess network security if there are only few vulnerabilities on the network.

We also group the results of the simulation we did for Scenario II. The grouping is also shown in the table in FIG. 16. The group A security metrics did not change for the entire time window (this is because the attack paths do not change when there are other exploitable vulnerabilities on the hosts). While the group B shows changes in their values.

An enterprise network usually consists of hundreds of hosts with many OS, applications and services running on them. In the simulations described above, we modelled a simple network with a few applications running on the hosts. However, embodiments are configured to operate with a large size network and also incorporate the OS vulnerabilities into T-HARM. In some embodiments, OS vulnerabilities can be incorporated by creating another layer in the T-HARM or combined with the application vulnerabilities.

Some embodiments provide a novel GSM named T-HARM that captures changes in dynamic networks. The above description demonstrates how T-HARM assesses the security of a dynamic enterprise network. The effect of network change on the existing cyber security metrics via the proposed security model is demonstrated by the two scenarios. Security metrics are identified i) to assess network security when there are only few vulnerabilities on the network and ii) to assess the security of a dynamic network with a large number of exploitable vulnerabilities.

Time-Independent Hierarchical Attack Representation Model (Ti-HARM)

Some embodiments comprise a new GSM which is referred to hereinafter as Time-independent Hierarchical Attack Representation Model (Ti-HARM) to systematically assess the overall security of dynamic networks. These embodiments seek to capture temporal network states at various times, and then aggregate them taking into account the attributes of the dynamic network. Ti-HARM not only assesses the security of each network state, but also identifies and assesses all potential attack paths in the multiple network states, as well as attack events happening over multiple network states. This is the first approach to aggregate network states for security modelling and analysis for the dynamic network taking into account various dynamic attributes.

Figure 17:
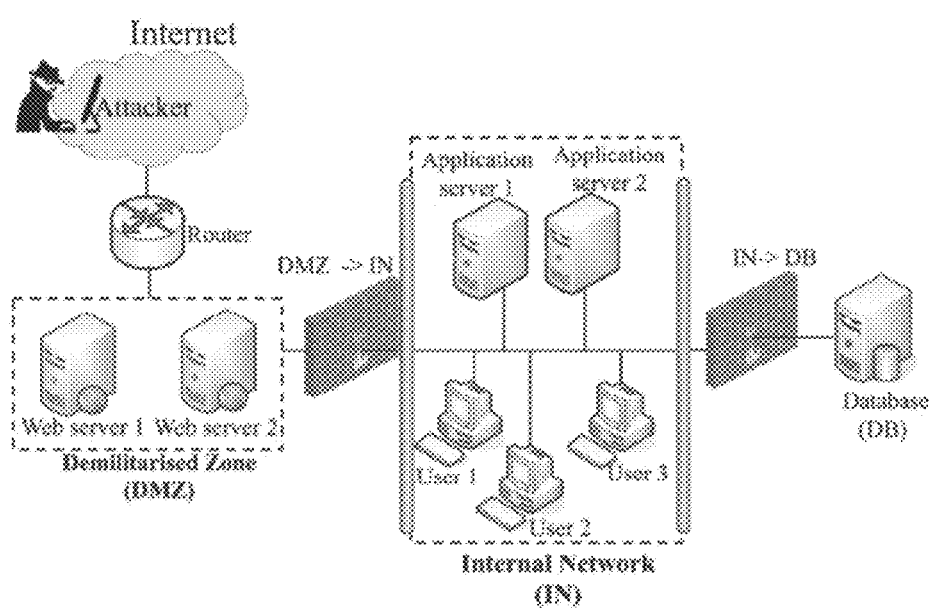
FIG. 17 is a schematic diagram of another example network.
Figure 18A:
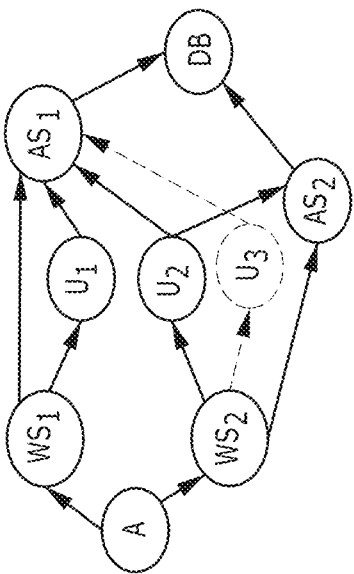
FIG. 18A-18F show topology configurations for the example network of FIG. 17.
Figure 18B:
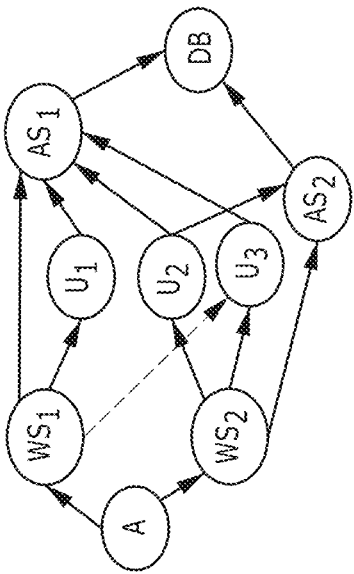
Figure 18C:
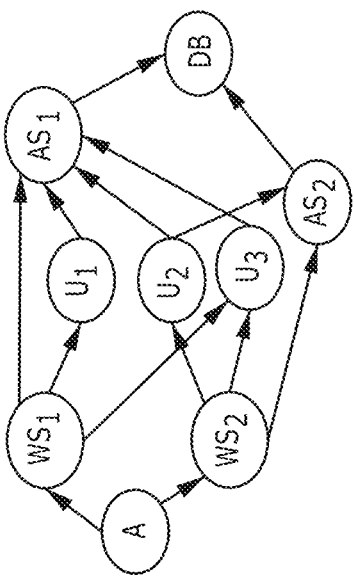
Figure 18D:
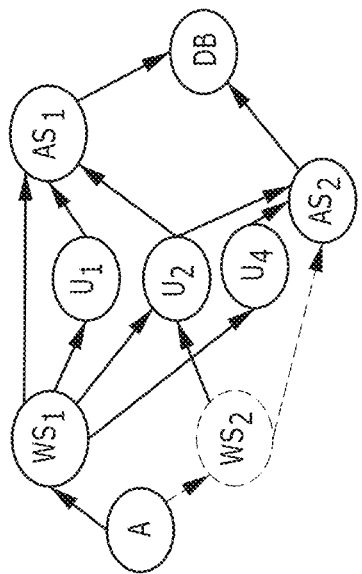
Figure 18E:
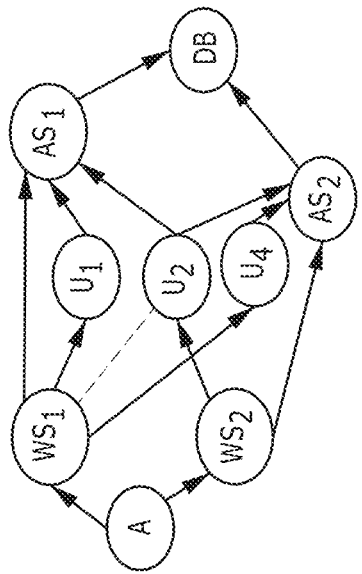
Figure 18F:
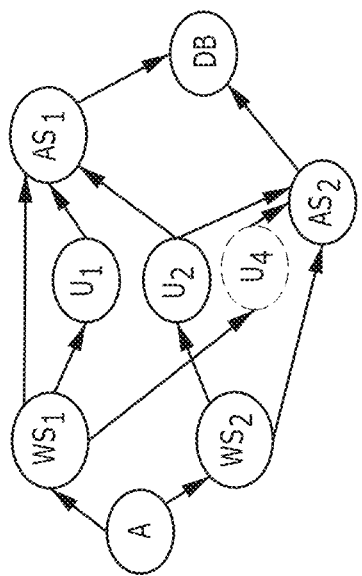

To demonstrate the Ti-HARM approach of some embodiments, we use a three-tier enterprise network (i.e., consisting of Demilitarised Zone (DMZ), subnets, firewall, web server which is accessible from the public Internet, etc.) as a running example as shown in FIG. 17. Further, FIGS. 18A-18F shows the various network topologies of the running example network at different times, which is assumed to be captured when changes are observed in the network (i.e., event-driven approach). The initial network consists of eight hosts located in three subnets; DMZ, internal network (IN) and the Database (DB) subnet. The subnets are divided by firewalls which control access from one subnet to another. However, the machines in the DMZ passively receive all service requests from the Internet then respond appropriately. Further, we assume a remote user cannot have access to the database directly as filtered by firewalls (i.e., for a remote user on the Internet to have access to the database server, he must first have access to the web server, then application server before reaching the database server). Here, we denote web server, application server, database server, and user workstations as $WS_i$, $AS_i$, DB and $U_i$, respectively (where, i=1, 2, 3). Further, we assume that the machine names do not change for the period we have considered within the network state. Also, we assume that the network hosts have vulnerabilities.

A. An Example Network

B. Attacker Model

In this example, we assume an attacker is located outside the network (i.e., accessing from the Internet) and the entry points to the network are the web servers in the DMZ subnet (i.e., the attacker cannot directly access any other host types). The attack goal is to escalate privileges within low privilege account and gain access to administrator rights, and further steal sensitive information stored on the DB. We assume that once the attacker successfully compromises a host, the attacker can gain the root privilege of the host and subsequently attack the next host in the network until the target host is compromised. We also assume that the effort required to compromise one host has no correlation with the effort required to compromise another host.

In some embodiments, Ti-HARM seeks to model the security of dynamic networks by aggregating the security components of multiple states to form a single GSM. By doing so, we can capture all network components observed in different network states, and thus allowing us to model all possible attack scenarios including ones carried out in multiple network states.

The following description describes the construction of Ti-HARM of some embodiments for the analysis of dynamic networks. In the construction, the following network properties are taken into account; multiple network states, time duration of states and the visibility of network components in the states. Specifically, we consider changes associated to hosts and their reachability information in multiple states. This is because the structure of network system (which comprises of hosts and edges) is important for some type of progressive attacks (e.g., sequential attacks).

In the Ti-HARM of some embodiments, the components have weight values based on their visibility over time (where a component that appears more frequently will have a higher weight value). This approach allows network administrators to perform other security analysis on network components with different visibilities. For example, more static network components are exposed to the attackers, allowing them to discover vulnerabilities and plan an attack that would still be viable in time. The network administrator can therefore use the Ti-HARM to discover such static components in order to mitigate such attacks.

We formulate the calculations of the weight value in Equation (1). The notations used in the equation are described in the table in FIG. 19.

$$nc_j^\alpha = \left( \frac{OC_{nc_j}}{|NS|} \times \frac{\sum_{i=0}^{|NS|} t(nc_j)}{T} \right) \times 100 \quad (1)$$

A. Formalism of Ti-HARM

The following description defines the Ti-HARM of some embodiments. The Ti-HARM is a two layered GSM comprising an upper layer and a lower layer. The upper layer captures the temporal hosts reachability information and the attacker's entry points (using AG) while the lower layer captures the vulnerability information of each hosts using ATs.

Definition 1. The Ti-HARM is a 4-tuple Ti-HARM=(U, L, C, w) which is constructed based on the calculated weight values of network states components that are equal or below the weight value threshold w (the calculation of the weight value is shown in Equation (1)). Here, U is the upper layer (AG) that models the set of hosts H and their reachability information, and L is the lower layer (ATs) that models the set of vulnerabilities V for each host $h_i \in H$, respectively. The mapping between the upper and the lower layers is defined as $C \subseteq \{(h_i \leftrightarrow AT)\} \forall h_i \in U, AT \in L$.

The upper and lower layers of the Ti-HARM are defined as follows.

Definition 2. The upper layer of the Ti-HARM is a 3-tuple (H, E, w), where H is a finite set of weighted hosts in the network where $h_i \in H$ and $h_i^\alpha \leq w$, $E \subseteq H \times H$ is a set of weighted edges where $e_i \in E$ and $e_i^\alpha \leq w$, and w is the weight threshold value.

Definition 3. The lower layer of the Ti-HARM is a set of ATs. Here, AT is a 5-tuple AT=(A, B, c, g, root), where $A \subseteq V$ is a set of vulnerabilities, $B=\{b^1, b^2, \ldots\}$ is a set of gates, $c \subseteq \{b^j \rightarrow e_i\} \forall b^j \in B$, $e_i \in A \cup B$ is a mapping of gates to vulnerabilities and other gates, $g \subseteq \{b^j \rightarrow \{AND, OR\}\}$ specifies the type of each gate, and root $\in A \cup B$ is the root node of the AT.

B. Constructing the Ti-HARM

To fully understand the security of a dynamic network, it is important to take into account changes in the networks (for an effective security analysis). So, some embodiments seek to provide an approach that takes into account changes associated to hosts, their connections and their duration as well. The following description uses an example network to describe the construction of the Ti-HARM of some embodiments. More specifically, in this example we use the topologies in FIGS. 18A-18F and use Equation 1 to calculate the weight value for each component.

Figures 22A, 22B, 22C:
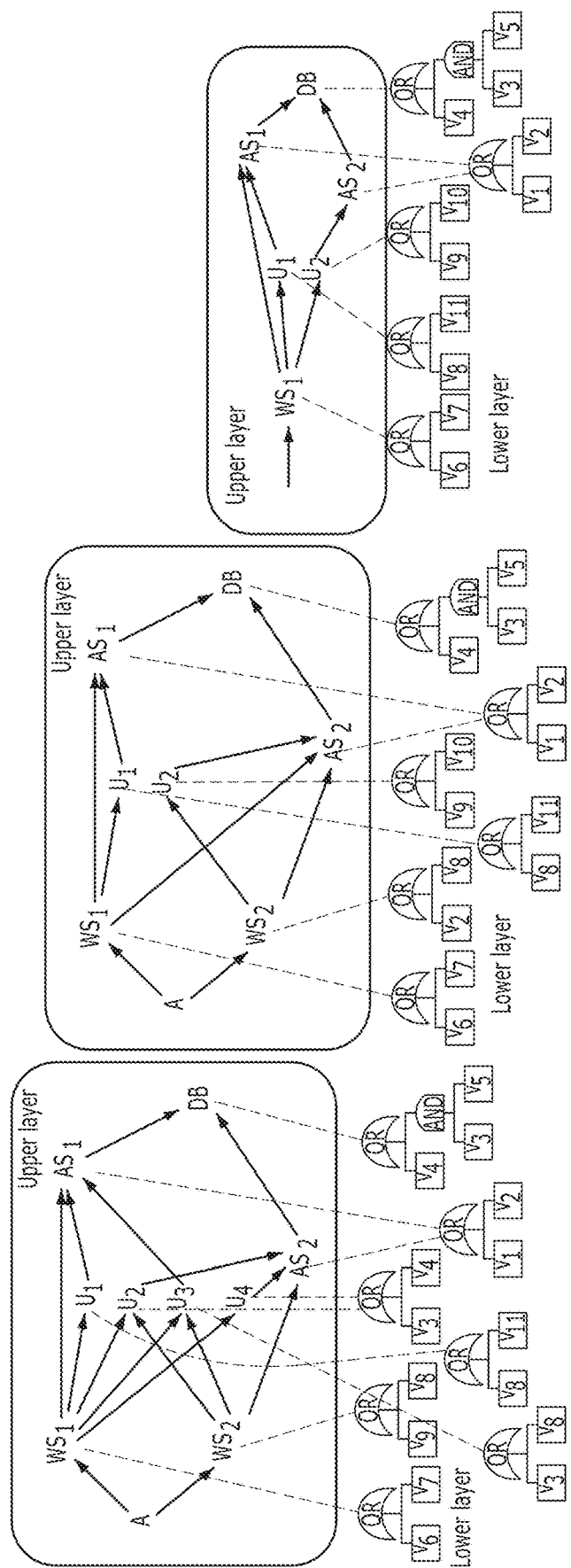
FIGS. 22A-22C are diagrams illustrating the Time-independent Hierarchical Attack Representation Model (Ti-HARM) for different weight values.

The tables in FIGS. 20 and 21 show the detailed calculations for the hosts and edges from the example network topologies, respectively. The weight value shows how each component appear in the network states for the time window (i.e., T=24 hours). FIGS. 22A-22C, shows the construction of the Ti-HARM (using different weight values) for the states shown in FIGS. 18A-18F. Specifically, FIG. 22A show the Ti-HARM with w=0.0%. This shows the extreme cases where the Ti-HARM captures all the observed components from all network states. In this case, we can say that all the possible attack scenarios are well captured. FIG. 22B capture only network component that are visible for half of the entire time window (i.e., w=50.0%). FIG. 22C capture the network components that are visible for all the times in the states (i.e., the components that have weight value of 100%. This is also the other extreme where only the most persistent components for the entire time window are captured).

C. Security Metrics Calculations

Security metrics are used for quantifying the security of various systems and their configurations. In the Ti-HARM of some embodiments, several security metrics are implemented in order to analyse the security of dynamic networks (with multiple network states). They are; (i) Risk on attack paths (ii) Probability of attack success on paths and (iii) Number of attack paths.

The following description demonstrates the effectiveness of some embodiments. The examples also cover the appropriate weight value (for hosts and edges) to use (for different network models) given multiple states, network components and their duration. To generalise, in this example we simulate two dynamic network models; (i) External DMZ Internal network (E D I network) and (ii) External Internal network (E I network), these may include a subset of other complex network topology within each subnet.

A. Scenario Description and Simulation Networks

In this example, we use a campus network which is open to large number of users and thus contains several workstations. We assume the network allows workstations to join the network without security scanning and that, dynamic host configuration protocol (DHCP) is used to automatically assign IP address settings to the hosts that are joining (for instance, BYOD). Further, the network users are allowed to install software on their workstations and this software may have one or more vulnerability. Hence, this may provide platforms for the attackers to hack into the network then have control over sensitive resources. Next, we describe the two network models as follows.

E-D-I network: The network is shown FIG. 23A. The network is divided into DMZ and internal network with the attacker located on external network. The internal network consists of three campuses and the database subnet. The subnets are separated by firewalls which controls access to resources found on each of the subnet. The DMZ subnet only allows external users to have access to the web server before having access to the Database. Further, the hosts in the internal network are allowed to send packets to other hosts within the internal network. The outside attacker is an authorised user who does not have permission to accessed sensitive data on the database. Here, the attack goal is for the attacker to escalate privileges from users' to administrator' privilege then steal sensitive data. We assume the attacker cannot reach the Database directly.

However, once an attacker connects to the network through the web servers, the attacker can easily obtain information about the network topology and vulnerabilities using tools such as Nmap and OpenVAS.

E-I network: The network is shown FIG. 23B. The network consists of only a firewall which controls access to the internal network. However, hosts in the internal network are able to send packets to other hosts within the internal network. We assume the attacker is located on the external network and therefore the attacker is able to reach only a few hosts (i.e., the web servers) however, the attacker can reach other hosts once he reaches the web server. Similarly, the attack goal here is too escalate privilege to administrators' then compromise the database.

B. Simulation Settings for Both Network Models

In this example, we use the networks described above as the initial network state to conduct several simulations. The initial number of hosts use for the simulation is 100 and calculate the average value. We assume each host has an OS with a vulnerability as shown in the table in FIG. 24 (in this example we randomly assigned the OS to the hosts and we collected this vulnerabilities from the U.S. National Vulnerability Database along with their Common Vulnerability Scoring System (CVSS) Base Score (BS)). We only selected a few vulnerabilities to demonstrate the dynamic modelling capabilities, but for full security analysis, all vulnerabilities can be modelled. Then, the following network changes are introduce to the states, which are; (a) additions of host, (b) removal of existing host, (c) additions of connection, and (d) removal of existing connection, with each state having a combination of the network changes (e.g. a state can have the combination of the changes {a,b,c,d} or {a, a, a, a}, etc). Thus, each state has a varying number of hosts and edges. In addition, each state has a time duration (i.e., the duration before the next network state is captured). In this simulation, a random time duration is assign to the states ranging from 1 to 5 hours. We model ten (10) network states for every time window (T).

Scenario I: Varying the Weight Value

In the Ti-HARM of some embodiments, various weight values can be used to construct the Ti-HARM and analyse the security of network states. We evaluate the effect of changing the weight values on the aforementioned network models.

Figure 25A:
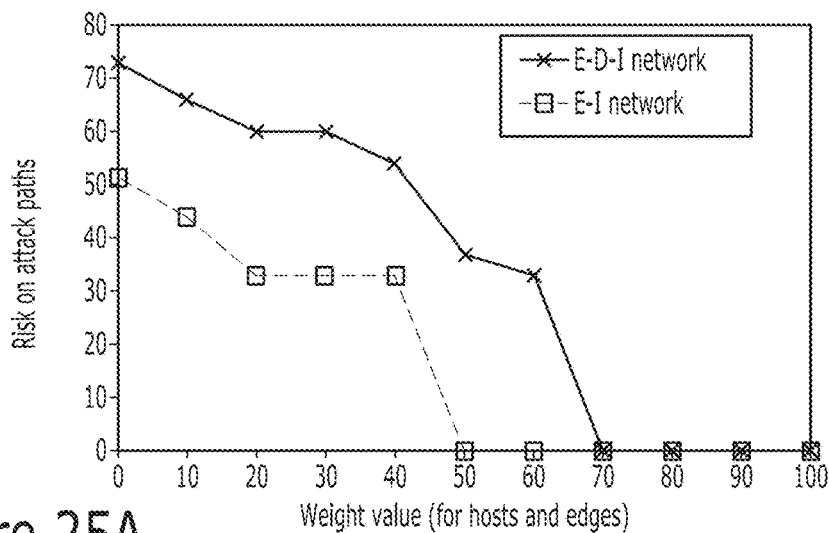
FIGS. 25A-25C are graphs illustrating the effect of increasing the weight value.
Figure 25B:
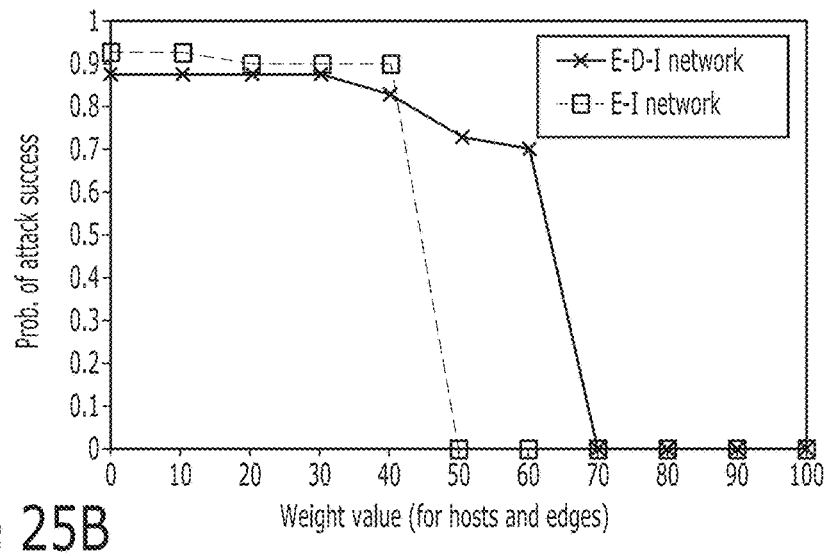
Figure 25C:
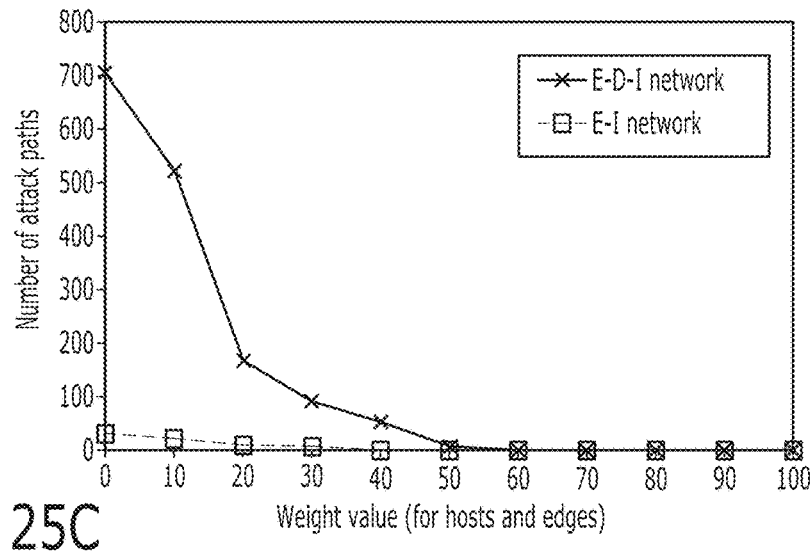

As shown by the results in FIGS. 25A-25C, irrespective of the network model used, increasing the weight value reduces the value of the security metrics. This is because increasing the weight value decreases the number of core components being modelled. Additionally, the changes in the security metrics indicates that the hosts and edges have varying weight value (they are very dynamic) when multiple states are taking into account. Also, we notice that when there are more persistent hosts and edges in the states, increasing the weight value do not affect the value of the security metrics for some range of weight values (this is shown at weight value 20% to 40% for the EI network except the number of attack paths). We also notice that, from 70.0% to 100.0% and 50.0% to 100.0% for E-D-I network and E-I network respectively, there is no attack path from the attacker to the target host because the weights for the edges (that is connecting the attacker to the target) are all lower than 70% and 50%, respectively. This means that there is no edge that was visible for 70% and 50% (or above) from the states, respectively.

In summary, using lower weight value covers more network hosts and show more attack scenarios. While, increasing the weight value will progressively reduce the number of hosts and edges and will model only the more persistent components.

Scenario II: Varying the Number of States

Figure 26A:
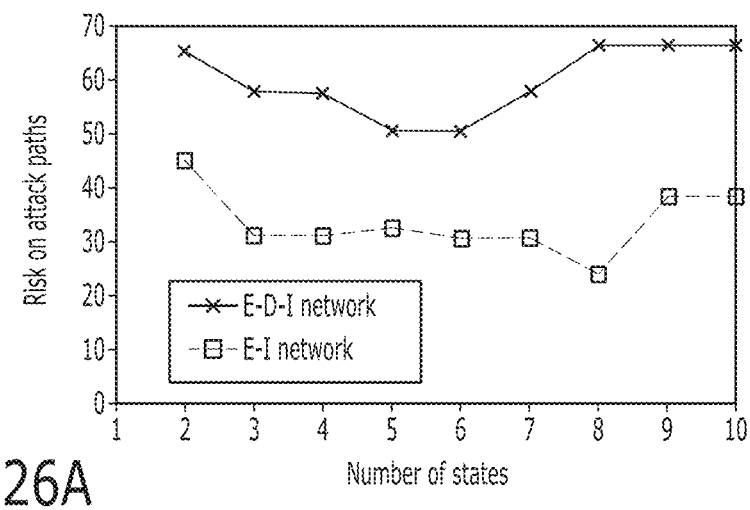
FIGS. 26A-26C are graphs illustrating the effect of varying the number of states.
Figure 26B:
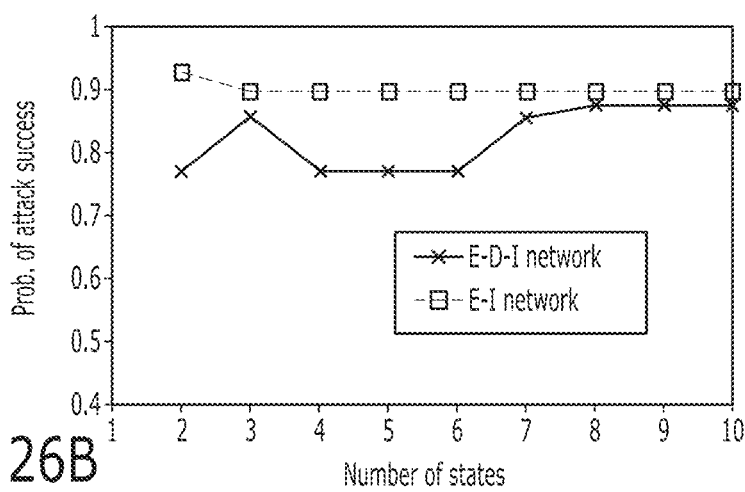
Figure 26C:
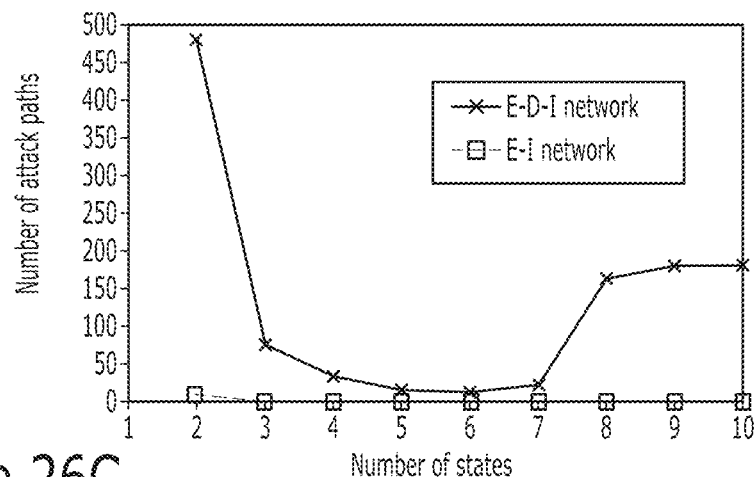

The Ti-HARM of some embodiments can model multiple network states with various security property. For this simulation, we vary the number of network states captured (ranging from two to ten states, with each state having various changes). The network and settings in section V-A and V-B is use. We carefully use the weight value w=40.0% for all the network states in order to ensure that the paths from the attacker to the target hosts is not completely lost for both network models. Here, we examine how the number of states model may affects the value of metrics for the given weight value. FIGS. 26A-26C show the results, given weight (w=40.0%).

The results show that increasing the number of network states will continuously change the representation of security posture even when the weight value is kept constant for all cases (this is evident by the changes shown by the security metric values in FIG. 26). We also observe that as the number of considered states increases, the weight for the network components reduces (this is shown by the security metric values when the following number of states is use; 2 to 8 states and state 2 to 6 states for E-I network and E-I-D network, respectively). Further, we observe that, in FIG. 26(c) there is a dramatic change in the number of attack scenarios from using 2 states to 3 states. This could be because most of the components are only visible in 1 of the 3 states or they are having a short time duration in the states (thus, their weight values are less than 40%). For this case, using small number of states may not fully show the changes in the Ti-HARM.

Scenario III: Varying the Number of Vulnerabilities

In this example, we vary the number of hosts vulnerabilities for the simulation networks described above. Here, no other settings have been changed. This example investigates how the number of vulnerabilities affect the security analysis when a given weight value is considered. Similarly, the weight value use for the ten network states in the Ti-HARM is w=40.0%. In the simulations, the vulnerabilities are randomly assigned to the hosts. However, hosts in the same subnet (e.g., hosts in the web server subnet) have the same type of vulnerabilities and risk values. In addition, the set of vulnerabilities found in network states for the same time window (T) may vary because the vulnerabilities are randomly assigned.

Figure 27A:
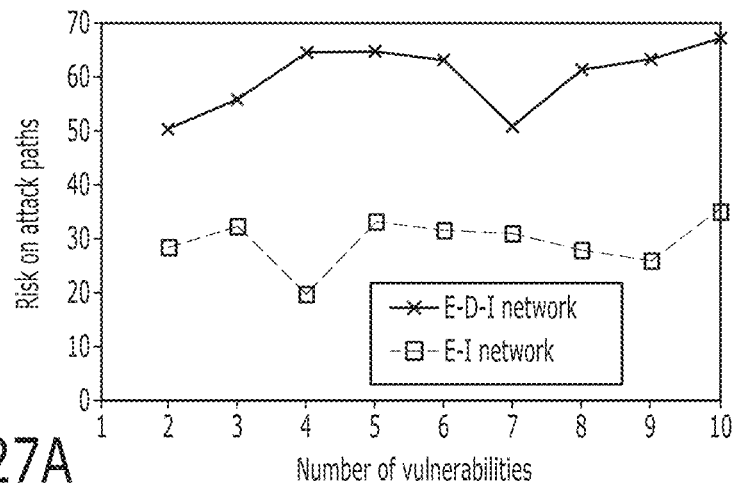
FIGS. 27A-27C are graphs illustrating the effect of varying the number of vulnerabilities.
Figure 27B:
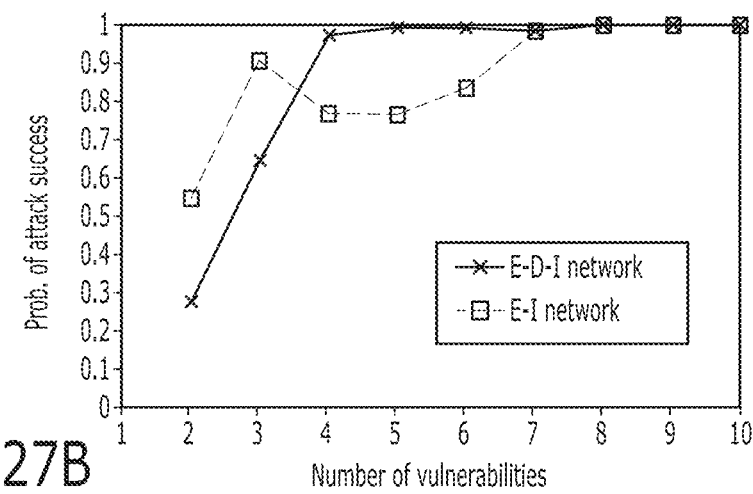
Figure 27C:
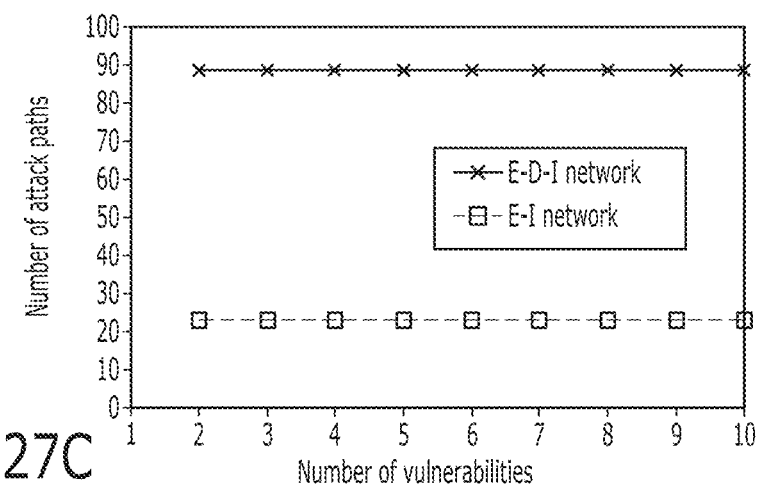

FIGS. 27A-27C show the results. In FIGS. 27A and 27B, the metrics show similar effect. Here, regardless of the network model and number of vulnerabilities found on hosts, the metrics show different values for the same weight factor. However, in FIG. 27C, the metric did not change for all time that vulnerabilities are added to the states. This is because we use a two-layer security model, where attack paths are captures in the upper layer and the vulnerabilities information are captured in the lower layer. Since the network hosts already have one exploitable vulnerability each, this creates attack paths for the hosts in the upper layer already. As a result, adding more vulnerabilities on the hosts do not affect the number of possible attack paths (because every attack path is already represented).

A. Comparing Ti-HARM with Temporal GSM

Ti-HARM seeks to comprehensively assess the security of dynamic network. The security model takes into account network states, duration of components in the states and their visibility over time. In particular, Ti-HARM aggregates all the captured network states components. By doing so, embodiments are able to have one GSM that models all the network states components and also, embodiments are able to calculate metrics that represents the security of the overall network states. As anticipated, the results in the above examples show that the propose approach provides more comprehensive analysis because all important network components are well captured (i.e., against a GSM that can capture only a single network state, which ignore other components joining the network afterwards). In addition, the approach is able to capture all the possible attack scenario that may happen for a period of time.

B. Using Weight Values for the Ti-HARM

A more static network component provides more time (or advantage) for an attacker to easily study and find potential system vulnerabilities, then exploit them in order to penetrate through valuable network assets and steal sensitive information. The simulation results in the examples described above show that, increasing the weight value in the Ti-HARM can generate a security model with the most persistent network components. Thus, the Ti-HARM can generate important components for security assessments.

C. Optimum Defense Model

Optimum countermeasures can vary for temporal network states. Some embodiments are configured for use in applying security countermeasures especially for large size network where it is infeasible to apply security hardening on all network components because of constraints (e.g., multiple states, budget, time, downtime, availability of countermeasures, etc). Ti-HARM can be constructed with only important hosts (i.e., hosts that appear more frequent) so as to only apply countermeasures on them.

Stateless Security Risk Assessment

Emerging networking technologies, such as Software-Defined Networking (SDN) and cloud computing, have granularity, flexibility and elasticity properties that utilize new and innovative approaches to enhance the cyber security. However, understanding the security posture of dynamic networks is difficult, especially with a new set of attack vectors with emerging networks. Traditionally, graphical security models, such as Attack Graphs, are used to evaluate the security posture of the network. However, these approaches assumed the network of static nature. As such, changes made due to networking functionalities (e.g., forwarding rule changes in SDN, VM migration in the cloud, etc.) also changes the security posture, which are not captured using the traditional graphical security models. This is often crucial information for high-level decision makers to understand the overview without the technical details.

The following description describes some embodiments which seek to provide stateless security risk assessment methodologies, which capture the overall security posture of the dynamic networks. The main idea is to aggregate all the observed 'network states' to conduct a security assessment using a graphical security model. Here, the term network state refers to the configuration of the network at a particular time. In order to capture different network states, we use a Temporal-Hierarchical Attack Representation Model (T-HARM), such as the T-HARM of the embodiments described above.

T-HARM itself can be used to evaluate the security of each network state, but cannot assess the overall security posture of the network. The following description demonstrates how some embodiments extend the functionalities of the T-HARM, namely visibility aggregation (VA) and weighted aggregation (WA) approaches to combine all the observed network states. This enables some embodiments to: 1) assess the overall security of dynamic networks; and 2) extend T-HARM to combine network states using two aggregation techniques.

Stateless Security Risk Assessment Methodology

The stateless security risk assessment provides network state-independent view of the security. That is, a computed security metric value represents all the observed network states. In the following description, we assume that networks have different dynamic changes over time, which makes a security assessment at a specific time may not be the same for other observable network states. There are some existing security modelling formalisms, such as ADVISE, providing the ability to model dynamic changes and the associated changes. However, the changes are constrained (such as attacker profile changes), where our approach aims to capture all generic changes.

Two main approaches are used: 1) VA, and 2) WA. The VA approach combines all the observed network configurations onto a single graphical security model. In terms of using the T-HARM, we can generate a single instance of the HARM using the VA. In contrast, the WA approach evaluates the security of each network state, and then combines them based on their time duration converted into weights (i.e., the proportion of the network state visibility).

A. Visibility Aggregation

The VA approach collects all visible network states. This approach enables one to capture all the network states information in the security assessment, and maintain the same security assessment as long as the observed states are not changed. Algorithm 1 in FIG. 28 shows the pseudocode for the VA approach. The limitation of the VA approach is that it does not reflect the exposure of different network states (i.e. the time information in not taken into account). To overcome this problem, the weighted aggregation, WA, approach is described next.

B. Weighted Aggregation

The WA approach incorporates exposure of different network states, which overcomes the limitations of the VA approach. Algorithm 2 in FIG. 29 shows the pseudocode for the WA approach. However, the WA approach cannot guarantee the same security assessment, which depends on the dynamic behavior of the network. Moreover, it requires more computational resources due to the security assessment of each network state, compared to one assessment using the VA approach.

In the following examples, an experimental network is provided with randomly generated dynamic properties based on host reachability and vulnerability changes (i.e., they can be added/modified/removed). Randomly selected vulnerabilities are assigned from the National Vulnerability Database to populate the values in the table, and the same approach but using the actual vulnerability information for real system can be applied in practice. Since there can be an arbitrary number of assets and applicable threats, there is no specific maximum risk value. However, it could be normalized based on the maximum observed risk value to provide a relative security risk overview of different network components. Using nine hosts, we generated eight network states (i.e., $S=\{s_1, \ldots, s_8\}$) with varying time duration of visibility. Two vulnerabilities are assigned to each host. The table in FIG. 30 shows that the security of different network states fluctuate, providing uncertain results. This is further validated when the optimal vulnerability to patch for each network state is different. The results using the VA and WA approaches are different (i.e., the risk value of 185.6 using the VA approach compared to 139.0 using the WA approach). The main difference is that the WA approach takes into account the duration of each network state.

Networking technologies with new properties make security assessments more difficult, due to continuously changing the security posture of the network. Some embodiments provide a stateless security risk assessment, with two approaches (VA and WA), to provide an overview the security of dynamic networks.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

REFERENCES

[1] B. Louise and T. Henry, "Bring your own Device," *ITNOW*, vol. 54, no. 1, pp. 24-25, 2012.

[2] J. B. Hong, D. S. Kim, and A. Haqiq, "What Vulnerability Do We Need to Patch First?" in *Proceeding of the 44th Annual IEEE/IFIP International Conference on Dependable Systems and Networks*, June 2014, pp. 684-689.

[3] J. B. Hong and D. S. Kim, "Assessing the Effectiveness of Moving Target Defenses Using Security Models," *IEEE Transactions on Dependable and Secure Computing*, vol. 13, no. 2, pp. 163-177, March 2016.

[4] N. Idika and B. Bhargava, "Extending Attack Graph-based Security Metrics and Aggregating their Application," *IEEE Transactions on Dependable and Secure Computing*, vol. 9, no. 1, pp. 75-85, February 2012.

[5] L. Wang, M. Albanese, and S. Ja jodia, *Network Hardening An Automated Approach to Improving Network Security*. Berlin, Heidelberg: Springer Briefs in Computer Science, 2014.

[6] V. Saini, Q. Duan, and V. Paruchuri, "Threat Modeling Using Attack Trees," *J. Comput. Sci. Coll.*, vol. 23, no. 4, pp. 124-131, April 2008.

[7] S. Mauw and M. Oostdijk, "Foundations of Attack Trees," in *Proceeding of International Conference on Information Security and Cryptology (ICISC) LNCS 3935*. Springer, 2005, pp. 186-198.

[8] S. Abraham and S. Nair, "Predicting Cyber Security Analytics Framework: A Nonhomogeneous Model for Security Quantification," in *Proceedings of International Conference of Security, Privacy and Trust Management*, 2014.

[9] A. Roy, D. S. Kim, and K. S. Trivedi, "ACT: Towards Unifying the Constructs of Attack and Defense Trees," *Sec. and Commun. Netw.*, vol. 5, no. 8, pp. 929-943, 2012.

[10] M. Frigault, L. Wang, A. Singhal, and S. Ja jodia, "Measuring Network Security Using Dynamic Bayesian Network," in *Proceedings of the 4th ACM workshop on Quality of Protection*. ACM, 2008, pp. 23-30.

[11] H. M. J. Almohri, L. T. Watson, D. Yao, and X. Ou, "Security Optimization of Dynamic Networks with Probabilistic Graph Modeling and Linear Programming," *IEEE Transactions on Dependable and Secure Computing*, vol. 13, no. 4, pp. 474-487, July 2016.

[12] I. Nwokedi, *Characterizing and Aggregating Attack Graph-based Security Metric, Ph.D. Thesis*. Center for Education and Research, Information Assurance and Security, Purdue University, 2010.

[13] C. Phillips and L. P. Swiler, "A Graph-based System for Network Vulnerability Analysis," in *Proceedings of the 1998 workshop on New Security paradigms*. ACM, 1998, pp. 71-79.

[14] R. Lippmann, K. Ingols, C. Scott, K. Piwowarski, K. Kratkiewics, M. Artz, and R. Cunningham, "Validating and Restoring Defense in Depth using Attack Graphs," in *Proceedings of Military Communications Conference*, 2006, pp. 31-38.

[15] X. Ou, W. F. Boyer, and M. A. McQueen, "A Scalable Approach to Attack Graph Generation," in *Proc. of the 13th ACM Conference on Computer and Communications Security (CCS)*. ACM, 2006, pp. 336-345.

[16] R. Ortalo, Y. Deswarte, and M. Kaaniche, "Experimenting with Quantitative Evaluation tools for Monitoring Operational Security," *IEEE Transactions on Software Engineering*, vol. 25, no. 5, pp. 633-650, 1999.

[17] W. Li and R. Vaughn, "Security Research Involving the Modeling of Network Exploitations Graphs," in *Proceedings of 6th IEEE International Symposium Cluster Computing and Grid Workshops*, 2006.

[18] J. Scott, *Social Network Analysis*. SAGE Publications, 2012. [Online]. Available: https://books.google.co.nz/books?id=MJolGBfYDGEC

[19] K. Lerman, R. Ghosh, and J. H. Kang, "Centrality Metric for Dynamic Networks," in *Proceedings of the Eight Workshop on Mining and Learning with Graphs*. ACM, 2010, pp. 70-77.

[20] D. Braha and Y. Bar-Yam, "From Centrality to Temporal Fame: Dynamic Centrality in Complex Networks," in *Social Science Research Network Working Paper Series*, 2006.

[21] Vassilis Kostakos, "Temporal Graphs," *Statistical Mechanics and its Applications*, vol. 388, no. 6, pp. 81 007-1023, 2009.

[22] D. Kempe, J. Kleinberg, and A. Kumar, "Connectivity and Inference Problems for Temporal Networks," *Journal of Computer and System Sciences*, vol. 64, no. 4, pp. 820-842, 2002. [Online]. Available: https://www.sciencedirect.com/science/article/pii/S0022000002918295

[23] A. Casteigts, P. Flocchini, W. Quattrociocchi, and N. Santoro, "Time-Varying Graphs and Dynamic Networks," in *Proceedings of 10th International Conference on Ad-*

[24] K. Wehmuth, A. Ziviani, and E. Fleury, "A Unifying Model for Representing Time-Varying Graphs," *CoRR*, vol. abs/1402.3488, 2014. [Online]. Available: http://arxiv.org/abs/1402.3488

[25] J. Tang, I. Leontiadis, S. Scellato, V. Nicosia, C. Mascolo, M. Musolesi, and V. Latora, "Applications of Temporal Graph Metrics to Real-World Networks," *CoRR*, vol. abs/1305.6974, 2013. [Online]. Available: http://arxiv.org/abs/1305.6974

[26] B.-M. Bui-Xuan, A. Ferreira, and A. Jarry, "Evolving Graphs and least Cost Journeys in Dynamic Networks," in *WiOpt '03: Modeling and Optimization in Mobile, Ad Hoc and Wireless Networks*, Sophia Antipolis, France, March 2003. [Online]. Available: https://hal.inria.fr/inria-00466676

[27] A. Ferreira, "Building a Reference Combinatorial Model for MANETs," *IEEE Network*, vol. 18, no. 5, pp. 24-29, September 2004.

[28] N. Santoro, W. Quattrociocchi, P. Flocchini, A. Casteigts, and F. Amblard, "Time varying Graphs and Social Network Analysis: Temporal indicators and Metrics," in *Artificial Intelligence and Simulation of Behaviour AISB*, 2011.

[29] K. Hausken and V. M. Bier, "Defending Against Multiple Different Attackers," *European Journal of Operational Research Elsevier*, vol. 211, no. 2, pp. 370-384, 2011.

[30] R. Deraison, *Nessus Scanner*, (accessed Feb. 3, 2016), http://nmap.orq/index.html.

[31] Nmap, Nmap-network mapper, (accessed Feb. 3, 2016), http://nmap.org/index.html.

[32] F. Arnold, D. Guck, R. Kumar, and M. Stoelinga, "Sequential and Parallel Attack Tree Modelling," in *Proceedings of the International Conference on Computer Safety, Reliability and Security*. Cham: Springer International Publishing, 2015, pp. 291-299.

[33] J. B. Hong, D. S. Kim, and T. Takaoka, "Scalable Attack Representation Model using Logic Reduction Techniques," in *Proceedings of the 12th IEEE International Conference on Trust, Security and Privacy in Computing and Communications (TrustCom*, 2013). IEEE, July 2013, pp. 404-411.

[34] B. Schneier, "Attack Trees," *Dr. Dobbs Journal of Software Tools*, vol. 24, no. 12, pp. 21-29, 1999.

[35] NVD, *National Vulnerability Database*, 2016 (accessed Feb. 3, 2016), https://nvd.nist.gov/.

[36] S. Liu and B. Cheng, "Cyberattacks: Why, What, Who, and How," *IT Professional*, vol. 11, no. 3, pp. 14-21, May 2009.

[37] G. S. Bopche and B. M. Mehtre, "Graph Similarity Metrics for Assessing Temporal Changes in Attack Surface of Dynamic Networks," *Comput. Secur.*, vol. 64, no. C, pp. 16-43, January 2017.

[38] MITRE-Corporation, *Common Vulnerabilities and Exposures*, accessed Aug. 12, 2017, https://cve.mitre.org/cve/cna.html.

[39] OpenVAS, *Open Source vulnerability scanner and manager*, accessed Mar. 20, 2017 http://www.openvas.org/

[40] CVSS, *CVSS version 3 Forum for Response and Security Team*, 2016 (accessed Feb. 3, 2016), https://www.first.org/cvss

[41] J. B. Hong and D. S. Kim, "Scalable Security Model Generation and Analysis using Kimportance Measures," in *Proceeding of Security and Privacy in Communication Networks*, 2013, pp. 270-287.

[42] NIST, *Common Vulnerabilities and Exposures*, (June, 2016), https://cve.mitre.org/cve/.

[43] B. Brykczynski and R. A. Small, "Reducing Internet-based Intrusions: Effective Security Patch Management," *IEEE Software*, vol. 20, no. 1, pp. 50-57, January 2003.

[44] A. Singhal and X. Ou, *Security Risk Analysis of Enterprise Networks Using Probabilistic Attack Graphs Technical Report NISTIR 7788, National Institute of Standards and Technology*, (September 2011).

[45] CERT, *Recent Vulnerabilities Computer Emergency Response Team*, (accessed Mar. 7, 2016), http://www.cert.org/.

[1a] S. Jha, O. Sheyner, and J. Wing, "Two Formal Analyses of Attack Graphs," in Proceedings of the 15th IEEE Computer Security Foundations Workshop. IEEE Computer Security Foundations, 2002.

[2a] N. Idika and B. Bhargava, "Extending Attack Graph-based Security Metrics and Aggregating their Application," IEEE Transactions on Dependable and Secure Computing (TDSC), vol. 9, no. 1, pp. 75-85, February 2012.

[3a] K. Ingols, M. Chu, R. Lippmann, S. Webster, and S. Boyer, "Modeling Modern Network Attacks and Countermeasures Using Attack Graphs," in Annual Computer Security Applications Conference (ACSAC), December 2009, pp. 117-126.

[5a] M. Frigault, L. Wang, A. Singhal, and S. Jajodia, "Measuring Network Security Using Dynamic Bayesian Network," in Proceedings of the 4th ACM Workshop on Quality of Protection (QoP). ACM, 2008, pp. 23-30.

[6a] N. Poolsappasit, R. Dewri, and I. Ray, "Dynamic Security Risk Management Using Bayesian Attack Graphs," IEEE Transactions on Dependable and Secure Computing, vol. 9, no. 1, pp. 61-74, January 2012.

[7a] S. Y. Enoch, M. Ge, J. B. Hong, H. Alzaid, and D. S. Kim, "Evaluating the Effectiveness of Security Metrics for Dynamic Networks," in Proceedings of the 16th IEEE International Conference On Trust, Security and Privacy in Computing and Communications (TrustCom2017). IEEE, August 2017, pp. 277-284.

[8a] C. Phillips and L. P. Swiler, "A Graph-based System for Network Vulnerability Analysis," in Proceedings of the 1998 workshop on New Security paradigms. ACM, 1998, pp. 71-79.

[9a] S. Abraham and S. Nair, "A Predictive Framework for Cyber Security Analytics using Attack Graphs," International Journal of Computer Networks and Communications (IJCNC 2015), vol. 7, no. 1, 2015.

[10a] X. Ou, W. F. Boyer, and M. A. McQueen, "A Scalable Approach to Attack Graph Generation," in Proceedings of the 13th ACM Conference on Computer and Communications Security (CCS 2006). ACM, 2006, pp. 336-345.

[11a] S. Y. Enoch, M. Ge, J. B. Hong, H. K. Kim, P. Kim, and D. S. Kim, "Security Modelling and Analysis of Dynamic Enterprise Networks," in Proceedings of the 16th IEEE International Conference on Computer and Information Technology, (CIT 2016). IEEE, December 2016, pp. 249-256.

[12a] S. Y. Enoch, J. B. Hong, M. Ge, H. Alzaid, and D. S. Kim, "Automated security investment analysis of dynamic networks," in Proceedings of the Australasian Computer Science Week Multiconference, ser. ACSW '18. New York, N.Y., USA: ACM, 2018, pp. 6:1-6:10. [Online]. Available: http://doi.acm.org/10.1145/3167918.3167964

[13a] J. B. Hong and D. S. Kim, "Scalable Security Model Generation and Analysis Using k-importance Measures," in International Conference on Security and Privacy in Communication Systems. Springer, 2013, pp. 270-287.

[14a] S. Y. Enoch, J. B. Hong, M. Ge, and D. S. Kim, "Composite Metrics for Network Security Analysis," Software Networking, vol. 2017, no. 1, pp. 137-160, 2017. [Online]. Available: http://dx.doi.org/10.13052/jsn24459739.2017.007

[15a] NVD, National Vulnerability Database, 2018 (accessed Feb. 3, 2018), https://nvd.nist.gov/.

[16a] R. Zhuang, S. Zhang, A. Bardas, S. A. DeLoach, X. Ou, and A. Singhal, "Investigating the Application of Moving Target Defenses to Network Security," in 6th International Symposium on Resilient Control Systems (ISRCS), August 2013, pp. 162-169.

[1b] B. Lantz, B. Heller, and N. McKeown, "A Network in a Laptop: Rapid Prototyping for Software-defined Networks," in *Proc. of the 9th ACM SIGCOMM Workshop*. ACM, 2010, pp. 19:1-19:6.

[2b] P. Mell and T. Grance, "SP 800-145. The NIST Definition of Cloud Computing," NIST, Gaithersburg, Md., United States, Tech. Rep., 2011. [3] D. Kreutz, F. Ramos, P. Verissimo, C. Rothenberg, S. Azodolmolky, and S. Uhlig, "Software-Defined Networking: A Comprehensive Survey," *Proc. of the IEEE*, vol. 103, no. 1, pp. 14-76, January 2015.

[4b] O. Sheyner, J. Haines, S. Jha, R. Lippmann, and J. Wing, "Automated Generation and Analysis of Attack Graphs," CMU, Tech. Rep., 2002.

[5b] B. Nunes, M. Mendonca, X. Nguyen, K. Obraczka, and T. Turletti, "A Survey of Software-Defined Networking: Past, Present, and Future of Programmable Networks," *IEEE Communications Surveys Tutorials*, vol. 16, no. 3, pp. 1617-1634, 2014.

[6b] B. Danev, R. Masti, G. Karame, and S. Capkun, "Enabling Secure VMvTPM Migration in Private Clouds," in *Proc. of the ACSAC* 2011. ACM, 2011, pp. 187-196.

[7b] S. Yusuf, M. Ge, J. Hong, H. Kim, P. Kim, and D. Kim, "Security Modelling and Analysis of Dynamic Enterprise Networks," in *Proc. of the IEEE CIT* 2016, 2016, pp. 249-256.

[8b] M. Ford, K. Keefe, E. LeMay, W. Sanders, and C. Muehrcke, "Implementing the ADVISE Security Modeling Formalism in Mobius," in *Proc. of the IEEE/IFIP DSN* 2013, 2013, pp. 1-8.

[9b] National Institute of Standards and Technology. National Vulnerability Database. [Online]. Available: https://nvd.nist.gov/

We claim:

1. A computer-implemented method for monitoring the security of a computing network, wherein the network comprises components which include a plurality of hosts and a plurality of edges which link connected hosts, and wherein the method comprises:

capturing first network state information at a first time;
storing the first network state information in a memory
capturing second network state information at a second time; and
storing the second network state information in the memory, wherein each of the first and second network state information comprises:
reachability information for at least one of the hosts, the reachability information being stored in an upper layer of a graphical security model (GSM); and
vulnerabilities information providing information about at least one vulnerability in at least one of the hosts or the edges, the vulnerabilities information being stored in a lower layer of the GSM;

wherein the method further comprises:
comparing, using a processing system, the first and second network state information;
detecting, using the processing system, a change in the security of the network during the time window between the first and second times;
storing, in the memory, security change data which is indicative of the change in the security of the network during the time window for a user to monitor the change in the security of the network; and
calculating a weight value for at least one of the components in the network, the weight value being indicative of the visibility of the component in the network over a predetermined period of time, wherein the weight value is calculated using the equation:

$$nc_j^\alpha = \left( \frac{OC_{nc_j}}{|NS|} \times \frac{\sum_{i=0}^{|NS|} t(nc_j)}{T} \right) \times 100.$$

2. The method of claim 1, wherein the computing network is a dynamic network in which the configuration of at least one of the hosts or the edges changes over time.

3. The method of claim 2, wherein the dynamic network is a network selected from a group including a cloud computing network, a software defined networking (SDN) arrangement or an Internet of Things (IoT) network.

4. The method of claim 1, wherein the method further comprises:
capturing and storing network state information in response to at least one of a time-driven trigger, an event-driven trigger or a user-driven trigger.

5. The method of claim 1, wherein detecting a change in the security of the network comprises detecting at least one of:
the addition of a new host to the network;
the removal of a host from the network;
the addition of a new edge to the network;
the removal of an edge from the network;
the addition of a vulnerability to a host in the network; or
the removal of a vulnerability from a host in the network.

6. The method of claim 1, wherein the method further comprises:
calculating, using the processing system, at least one security metric for the network at the first time and at the second time.

7. The method of claim 1, wherein the method further comprises:
constructing a 4-tuple, (U, L, C, w) based on the calculated weight value of a component that is less than or equal to a predetermined weight value threshold w, where U is the upper layer which models a set of hosts H and the set of hosts H reachability information and L is the lower layer (ATs) that models the set of vulnerabilities V for each host $h_i \in H$ respectively.

8. The method of claim 7, wherein the method further comprises:
defining a mapping between the upper and lower layers as:

$$C \subseteq \{(h_i \leftrightarrow AT)\} \forall h_i \in U, AT \in L$$

9. The method of claim 8, wherein the method further comprises:
defining the upper layer as a 3-tuple (H, E, w), where H is a finite set of weighted hosts in the network where $h_i \in H$ and $h_i^\alpha \leq w$, $E \subseteq H \times H$ is a set of weighted edges where $e_i \in E$ and $e_i^\alpha \leq w$, and w is the weight threshold value.

10. The method of claim 9, wherein the method further comprises:
defining the lower layer as a 5-tuple (A, B, c, g, root), where $A \subseteq V$ is a set of vulnerabilities, $B=\{b^1, b^2, \ldots\}$ is a set of gates, $c \subseteq \{b^j \rightarrow e_l\} \forall b^j \in B$, $e_l \in A \cup B$ is a mapping of gates to vulnerabilities and other gates, $g \subseteq \{b^j \rightarrow \{AND, OR\}\}$ specifies the type of each gate, and root $\in A \cup B$ is the root node of the AT.

11. A non-transitory computer readable medium storing executable instructions which, when executed by a processor of a computing system, cause the computing system to monitor the security of a computing network, wherein the network comprises components which include a plurality of hosts and a plurality of edges which link connected hosts, and wherein the monitoring comprises:
capturing first network state information at a first time;
storing the first network state information in a memory
capturing second network state information at a second time; and
storing the second network state information in the memory, wherein each of the first and second network state information comprises:
reachability information for at least one of the hosts, the reachability information being stored in an upper layer of a graphical security model (GSM); and
vulnerabilities information providing information about at least one vulnerability in at least one of the hosts or the edges, the vulnerabilities information being stored in a lower layer of the GSM;
wherein the method further comprises:
comparing, using a processing system, the first and second network state information;
detecting, using the processing system, a change in the security of the network during the time window between the first and second times;
storing, in the memory, security change data which is indicative of the change in the security of the network during the time window for a user to monitor the change in the security of the network; and
calculating a weight value for at least one of the components in the network, the weight value being indicative of the visibility of the component in the network over a predetermined period of time, wherein the weight value is calculated using the equation:

$$nc_j^\alpha = \left( \frac{OC_{nc_j}}{|NS|} \times \frac{\sum_{i=0}^{|NS|} t(nc_j)}{T} \right) \times 100.$$

12. A system for monitoring the security of a computing network, the network comprising components which include a plurality of hosts and a plurality of edges which link connected hosts, wherein the system comprises a processor and a memory, the memory storing executable instructions which, when executed by the processor, cause the system to monitor the security of the computing network by:
capturing first network state information at a first time;
storing the first network state information in a memory
capturing second network state information at a second time; and
storing the second network state information in the memory, wherein each of the first and second network state information comprises:
reachability information for at least one of the hosts, the reachability information being stored in an upper layer of a graphical security model (GSM); and
vulnerabilities information providing information about at least one vulnerability in at least one of the hosts or the edges, the vulnerabilities information being stored in a lower layer of the GSM;
wherein the method further comprises:
comparing, using a processing system, the first and second network state information;
detecting, using the processing system, a change in the security of the network during the time window between the first and second times;
storing, in the memory, security change data which is indicative of the change in the security of the network during the time window for a user to monitor the change in the security of the network; and
calculating a weight value for at least one of the components in the network, the weight value being indicative of the visibility of the component in the network over a predetermined period of time, wherein the weight value is calculated using the equation:

$$nc_j^\alpha = \left( \frac{OC_{nc_j}}{|NS|} \times \frac{\sum_{i=0}^{|NS|} t(nc_j)}{T} \right) \times 100.$$

* * * * *